July 14, 1964 L. M. SPANDORFER 3,141,067

AUTOMATIC ELECTRONIC COMMUNICATION SWITCHING EXCHANGE

Filed Nov. 17, 1960 14 Sheets-Sheet 1

INVENTOR,
LESTER M. SPANDORFER.

BY Jack H. Linscott

ATTORNEY.

AUTOMATIC ELECTRONIC COMMUNICATION SWITCHING EXCHANGE

Filed Nov. 17, 1960 14 Sheets-Sheet 2

INVENTOR,
LESTER M. SPANDORFER.
BY Jack H. Linscott
ATTORNEY.

July 14, 1964 L. M. SPANDORFER 3,141,067

AUTOMATIC ELECTRONIC COMMUNICATION SWITCHING EXCHANGE

Filed Nov. 17, 1960

14 Sheets-Sheet 3

INVENTOR,
LESTER M. SPANDORFER.

BY Jack H. Linscott

ATTORNEY.

INVENTOR,
LESTER M. SPANDORFER
BY Jack H. Linscott
ATTORNEY.

*INVENTOR,*
LESTER M. SPANDORFER
*BY* Jack H. Linscott
ATTORNEY.

INVENTOR,
LESTER M. SPANDORFER
BY Jack H. Linscott
ATTORNEY.

INVENTOR.
LESTER M. SPANDORFER
BY Jack H Linscott
ATTORNEY

INVENTOR,
LESTER M. SPANDORFER
BY Jack H. Linecott
ATTORNEY.

July 14, 1964 L. M. SPANDORFER 3,141,067

AUTOMATIC ELECTRONIC COMMUNICATION SWITCHING EXCHANGE

Filed Nov. 17, 1960 14 Sheets-Sheet 9

INVENTOR,
LESTER M. SPANDORFER

BY *Jack H. Linscott*

ATTORNEY.

July 14, 1964 L. M. SPANDORFER 3,141,067

AUTOMATIC ELECTRONIC COMMUNICATION SWITCHING EXCHANGE

Filed Nov. 17, 1960

14 Sheets-Sheet 10

INVENTOR,
LESTER M. SPANDORFER
BY *Jack H. Linscott*
ATTORNEY.

INVENTOR,
LESTER M. SPANDORFER
BY Jack H. Linscott
ATTORNEY.

INVENTOR,
LESTER M. SPANDOFFER
BY Jack H. Linscott
ATTORNEY,

INVENTOR,
LESTER M. SPANDORFER
BY Jack H. Linscott
ATTORNEY.

*INVENTOR.*
LESTER M. SPANDORFER
*BY* Jack H. Linscott
ATTORNEY

United States Patent Office 3,141,067 Patented July 14, 1964

3,141,067
AUTOMATIC ELECTRONIC COMMUNICATION SWITCHING EXCHANGE

Lester M. Spandorfer, Philadelphia, Pa., assignor to the United States of America as represented by the Secretary of the Army Filed Nov. 17, 1960, Ser. No. 70,086
10 Claims. (Cl. 179—18)

This invention relates to telephone or other communication systems and particularly to automatic electronic switching exchanges for use in such systems.

A general object of the invention is to automatically make the interconnections between a number of subscriber lines in a communication system economically and efficiently.

Another object is to accomplish the purposes of a conventional electro-mechanical telephone exchange in a manner which results in optimum system design from the standpoint of requiring a minimum number of relatively inexpensive electronic control components for a given number of subscriber connections.

A related object is to develop a dial telephone central switching office using transistor-like control devices to the maximum practical extent and utilizing the inherent characteristics of such devices in the most advantageous manner possible.

A more specific object it to develop an automatic communication exchange which is lighter, smaller and more economical than those using conventional electro-mechanical principles and requiring less maintenance and fewer electronic devices than other known electronic exchanges for providing communication connections between a given number of subscriber lines.

These objects are attained in accordance with the invention by the provision of an automatic communication switching exchange including a novel switching matrix or network utilizing electronic devices, for connecting together in communication relation various pairs of subscribers on demand of one or more of them, and to maintain or "hold" the connections as long as desired by the subscribers involved.

For purposes of generality, the use of this switching matrix need not be confined to telephone exchanges but may be used whenever it is desired to affect the interconnection of any pair of communication lines out of many such lines. An example is the communication problem between a large group of electronic computers. If any computer in the group needs the assistance of other computers, the switching matrix can be used to accomplish the desired interconnection of the computers in pairs or of many pairs simultaneously.

In one embodiment of the invention, the switching matrix comprises a number of separate lines for respectively transmitting the speech signals, dialing and other signal control pulses initiated by separate subscribers and a number of transmission links crossing the lines at different points. Each of the lines can be connected to or given access to each of the transmission links by means of a "crosspoint" switch located at each intersection of the lines and links. Each crosspoint switch, known as a crosspoint, consists of a single transistor or semiconductor having a negative reistance characteristic, which can be switched from a state of low conduction (OFF) in which it is "open" so as not to electrically connect the associated line and link, to a state of high conduction (ON) in which it is "closed" so as to electrically connect the associated line and link. An interconnecting path between any two subscribers A and B is completed by closing two crosspoints, referred to as "A" and "B" crosspoints, respectively associated with their subscriber lines through an idle link. Although transistors have been used previously in electronic switching exchanges to provide the basic communication paths between the subscribers of a telephone system, the arrangements used in applicant's system differ therefrom in the method of controlling these crosspoints, the economy of the array of crosspoints and the manner of making the interconnection between subscribers which involves automatically selecting a non-busy or idle link out of a total of M links, closing and holding closed the two desired crosspoints A and B of NM possible crosspoints, and finally releasing the two operated crosspoints at the termination of a conversation. These differences are believed to be new, fundamentally desirable and to constitute invention over prior art electronic exchanges. The entire system design is predicated upon the new properties and actions of the Switching Matrix which sufficiently govern the design and action of the remainder of the electronic exchange such that the overall exchange represents a new philosophy in electronic exchanges.

In addition to the "open" and "closed" switch properties, the crosspoint has several other important features. First, it operates as an on-off memory device (flipflop) without the need of additional equipment. The second feature releates to the lockout property possessed by the linear array of crosspoints attached to any given line, which enables the array inherently to provide its own selection mechanism without the necessity of auxiliary selector diodes or other selection equipment utilized by prior art devices. Also, the exchange does not require the use of separate link allotter and line finder units used in prior art exchanges, these functions being inherently contained in the action of the lockout switching network and in the manner of controlling the crosspoints. Another feature in the lockout switching network is that the transistors or the other electronic control elements are used as talking path crosspoints. A further feature is that dial information reaches the Dial Pulse Register via the A crosspoint in the switching network rather than through a separate supervisory bypath as in prior art systems in which the bypaths are relatively complex and completely separate from the switching network and thus in principle represent redundant or wasted equipment.

These and other objects and features of the invention will be better understood from the following detailed description thereof when it is read in conjunction with the various figures in the accompanying drawings in which.

Figure 11:
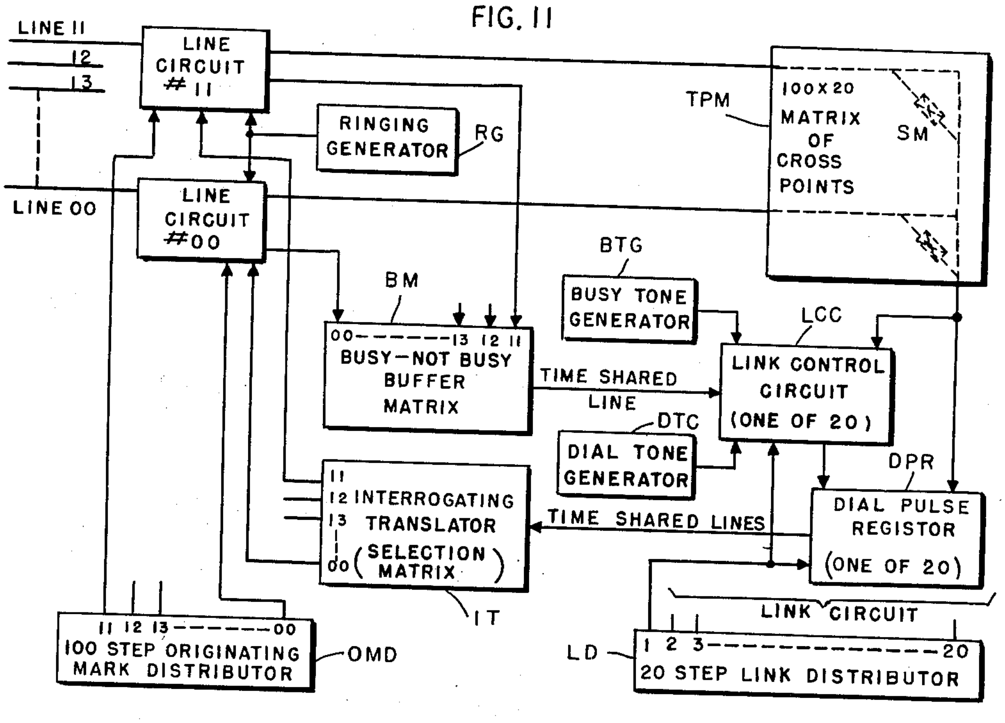
FIG. 11 is a general block diagram of a portion of the lockout network telephone system including the relationship of the main control elements embodying the invention.
Figure 14:
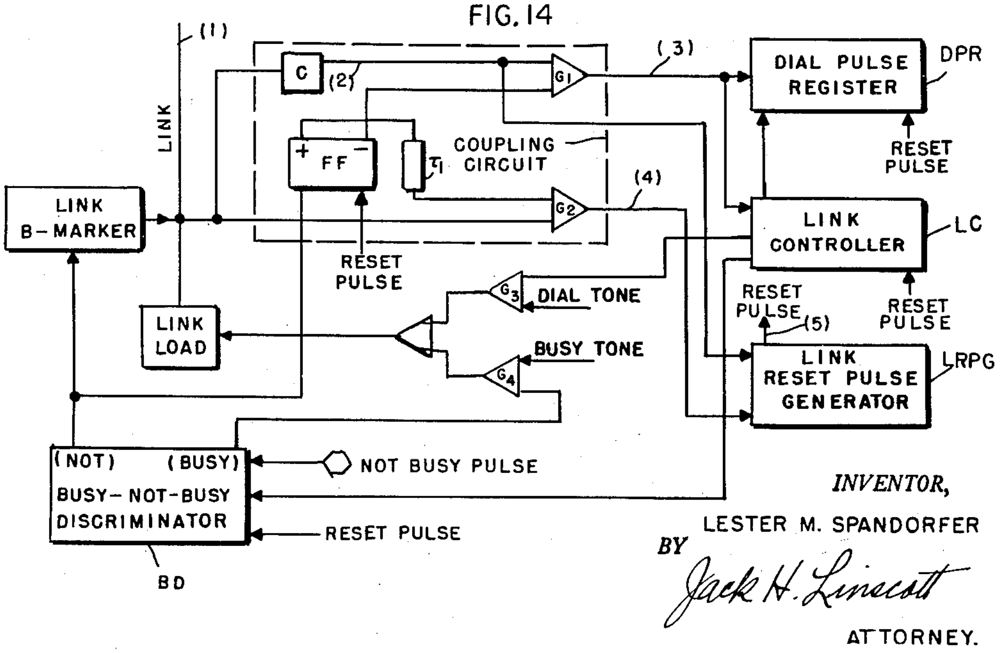
FIG. 14 is a general block diagram of a link control circuit used in the control circuit of the invention.
Figure 18:
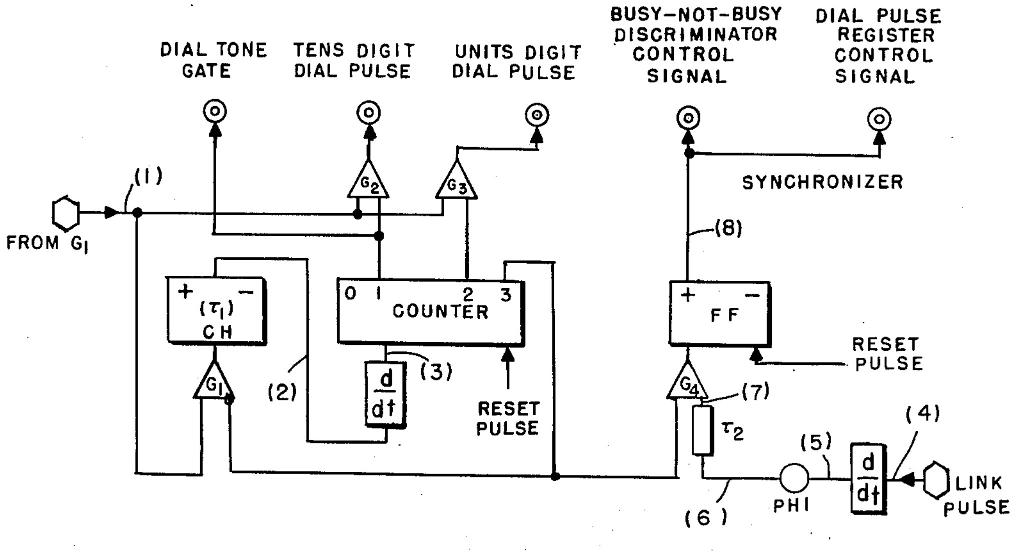
Figure 18A:
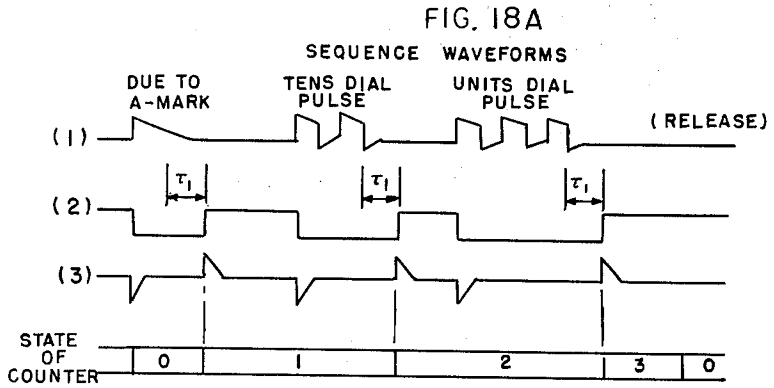
Figure 18A:
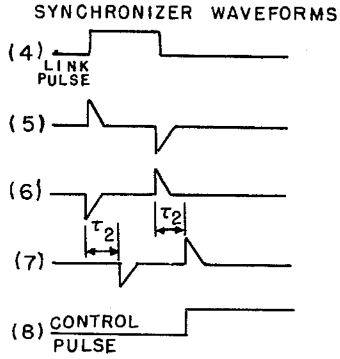
Figure 19:
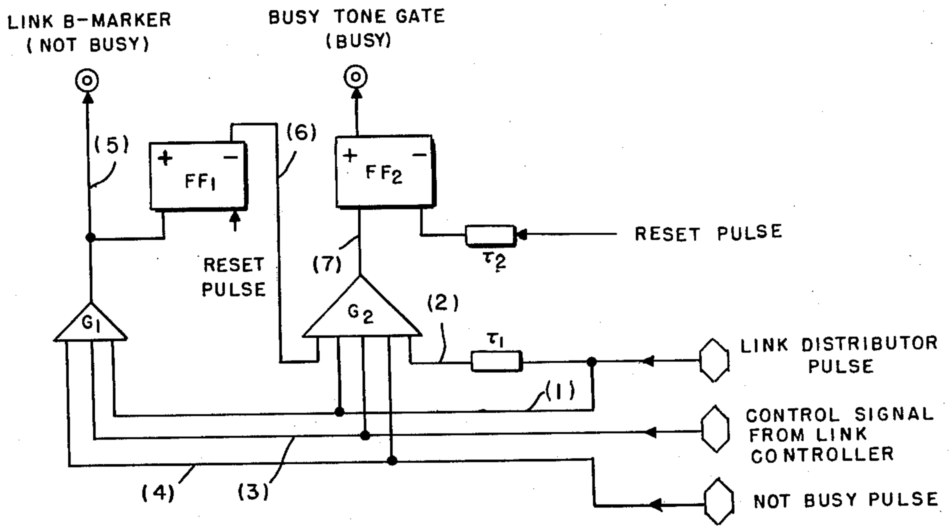
Figure 19A:
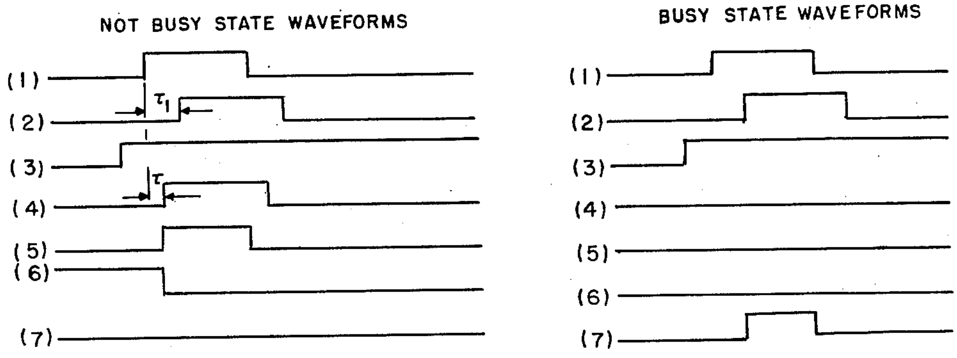
Figure 20:
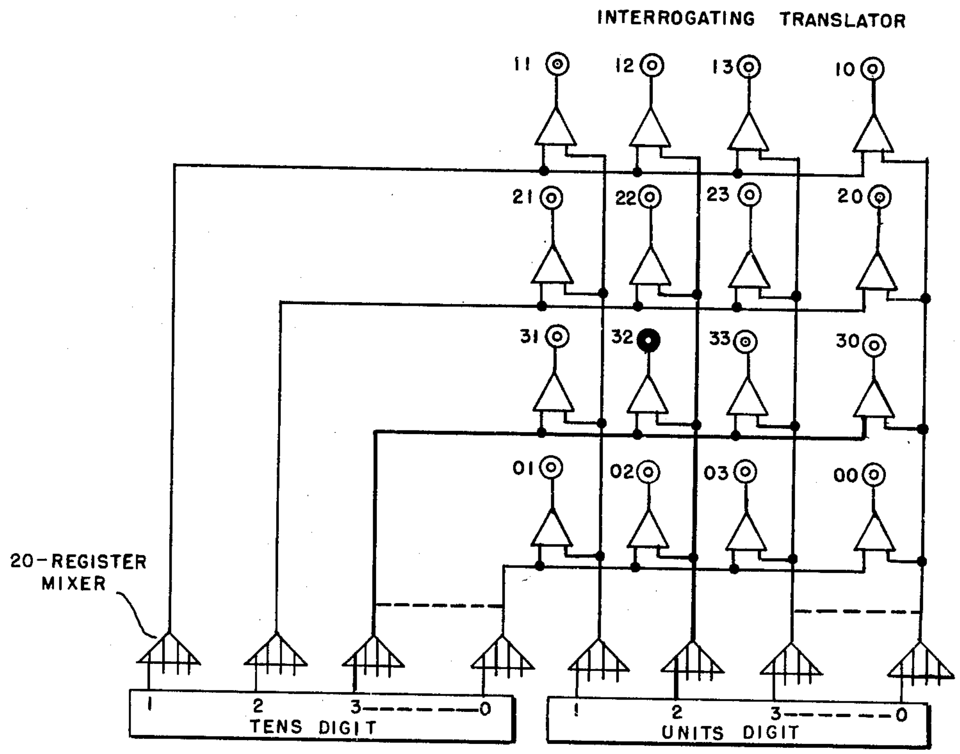
Figure 21:
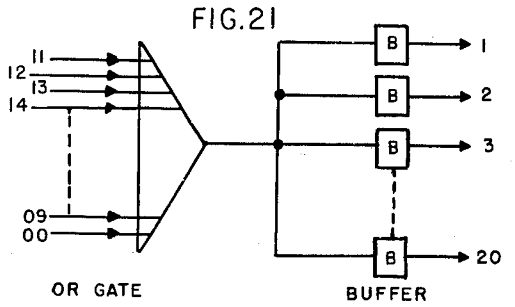
Figure 22:
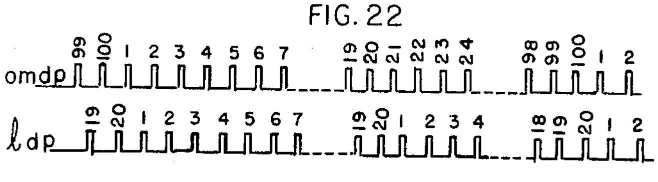
Figure 23:
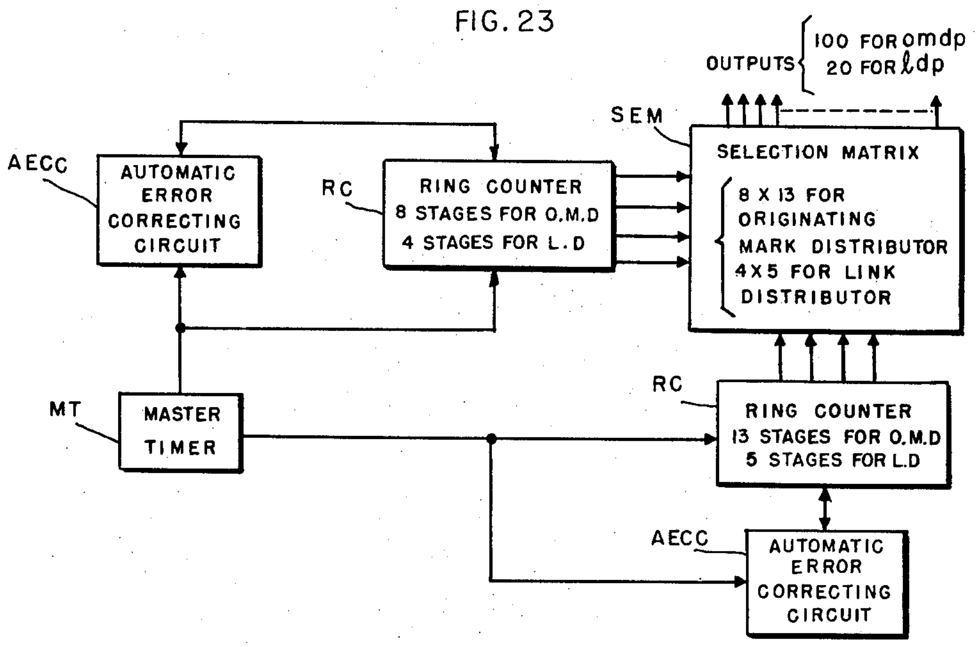
Figure 24:
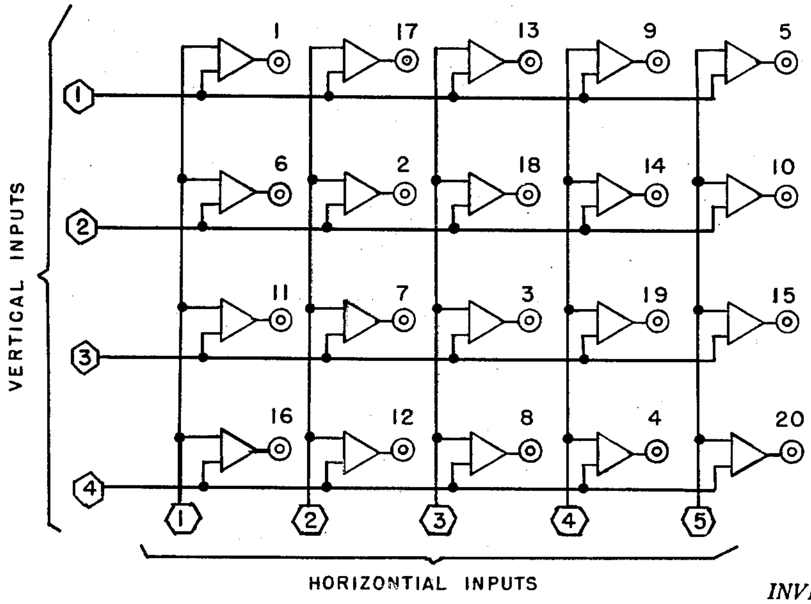
Figure 25:
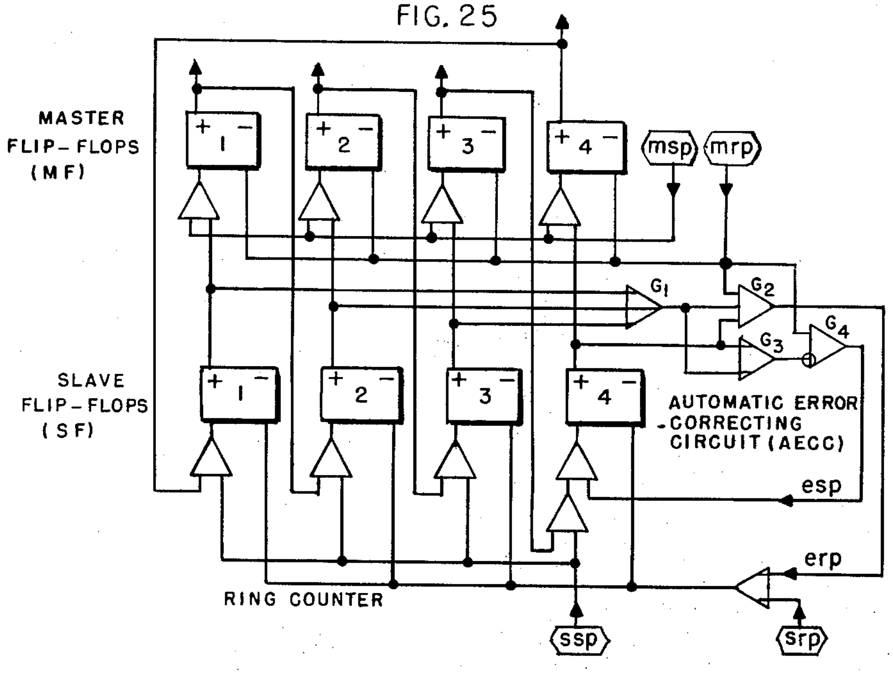
Figure 25A:
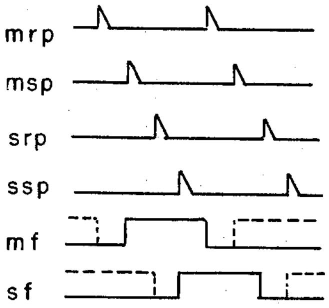
Figure 26:
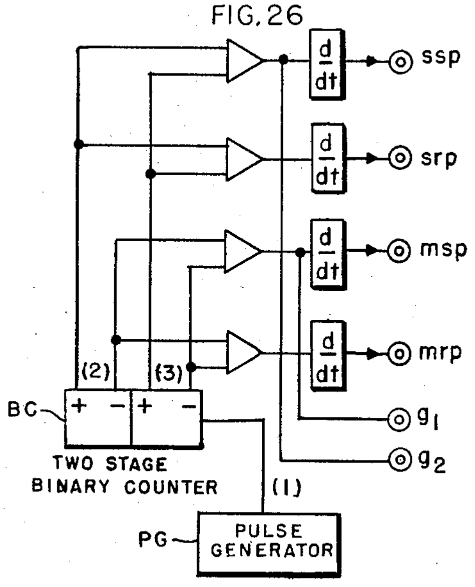
Figure 26A:
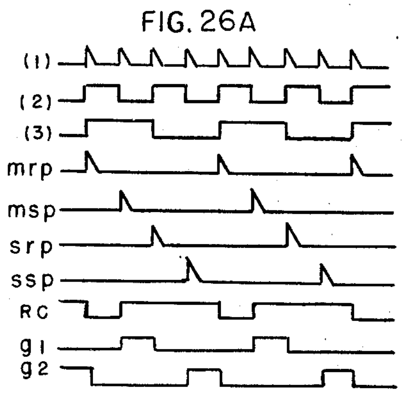
Figure 27:
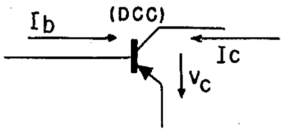
Figure 27A:
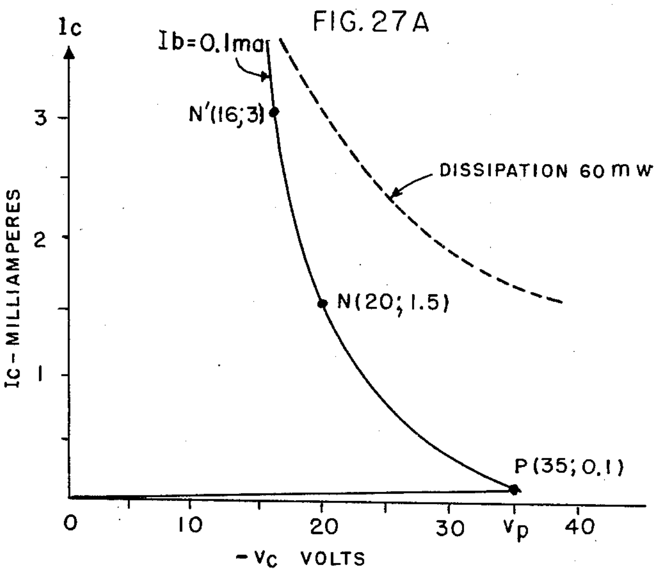
Figures 28, 29:
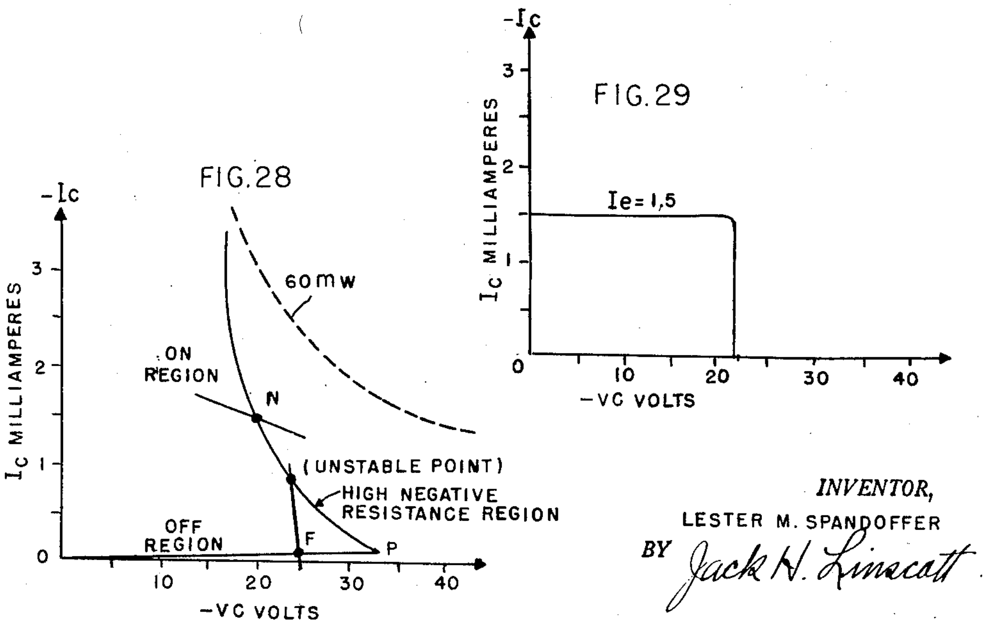
Figure 30:
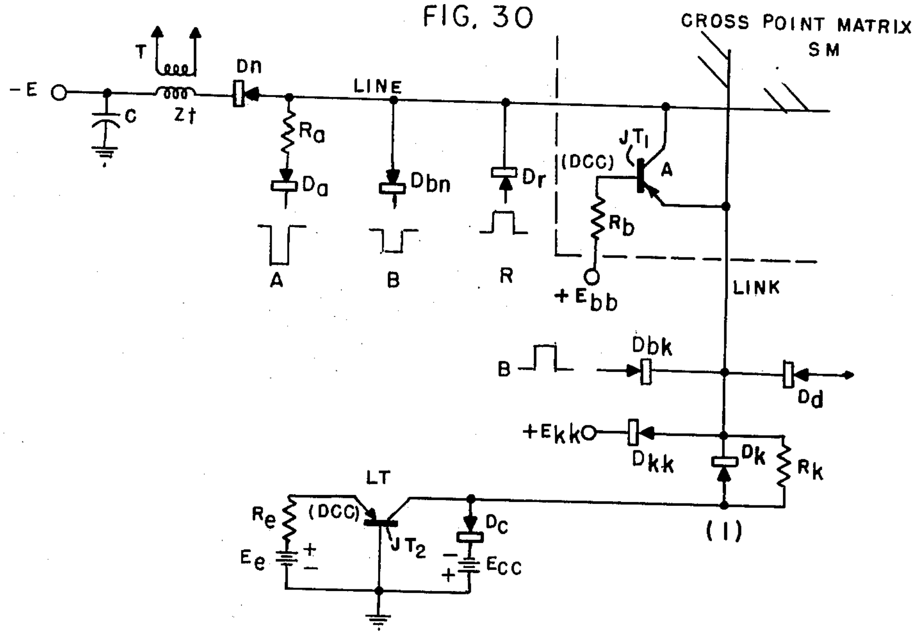
Figure 31:
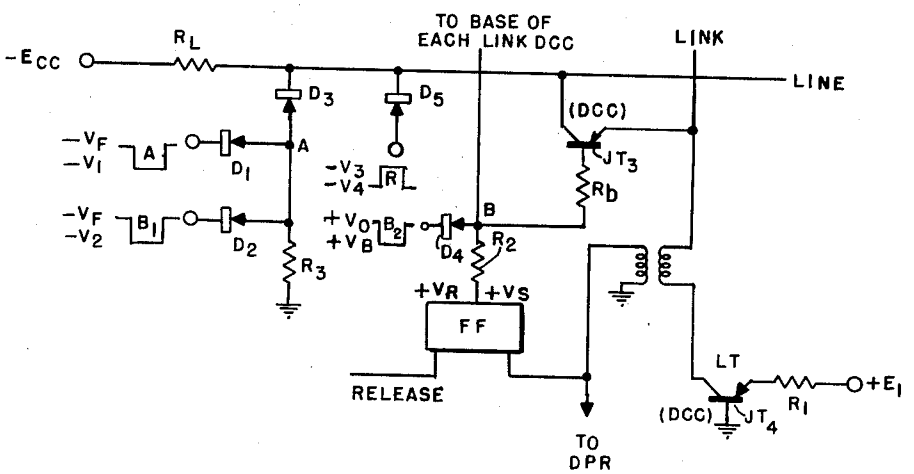
Figure 32:
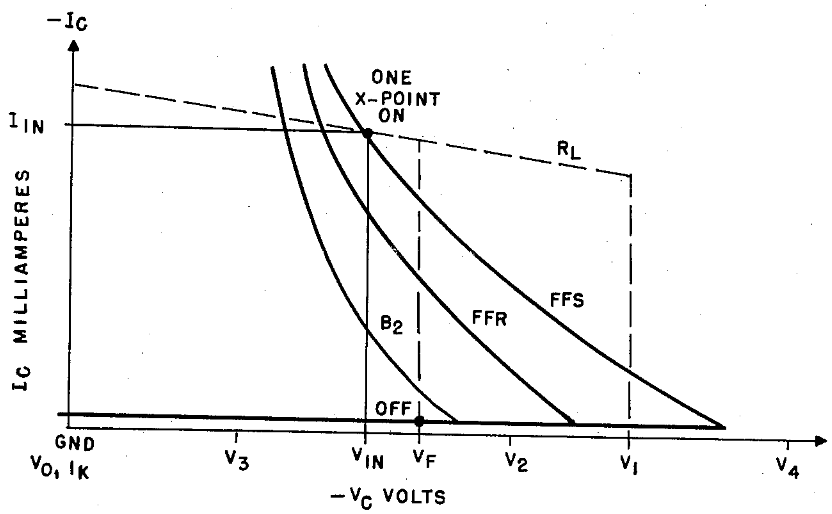
Figure 32A:
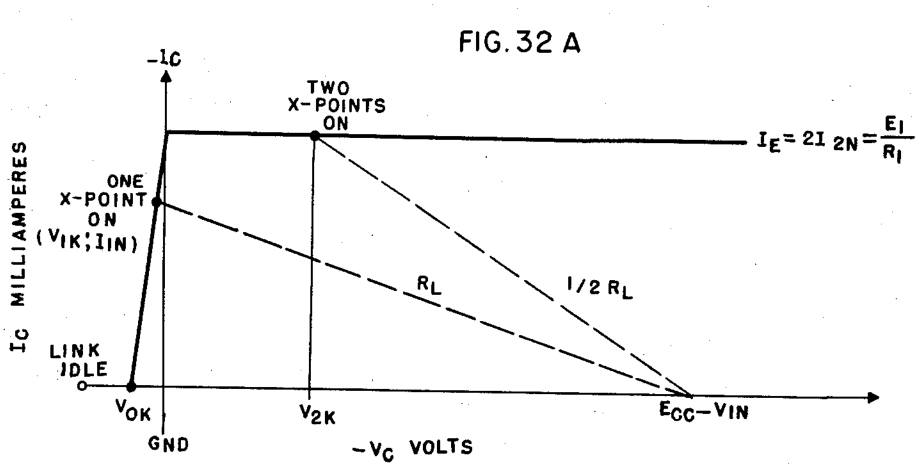

FIGS. 18 and 18A respectively show schematically a link controller in the link circuit of FIG. 14, and some of the waveforms which are produced during its operation;

FIGS. 19 and 19A respectively show a block diagram of a busy-not busy line discriminator used in the link circuit of FIG. 14, and pertinent waveforms at various points in the system;

FIG. 20 is a block diagram of an interrogating translator used in the lockout network telephone system in accordance with the invention in FIG. 11;

FIG. 21 is a block diagram of the busy-not busy buffer matrix used in the system of FIG. 11;

FIG. 22 shows a timing arrangement of the pulses used for controlling the operation of the switching matrix of the invention;

FIG. 23 is a block diagram of the 20-step link distributor and the 10-step originating mark distributor for producing pulses used for controlling the switching matrix in accordance with the invention;

FIG. 24 shows in block diagrammatic form the selection matrix used in the system of FIG. 23;

FIGS. 25 and 25A respectively show a block diagram for the ring counter and automatic error-correcting circuit for the originating mark distributor and link distibutor used in the system of the invention and its operating and output waveforms;

FIGS. 26 and 26A respectively show schematically the circuit of the master timer with the waveforms produced at various points therein;

FIGS. 27 and 27A respectively show a single junction transistor unit operated in its "Delayed Collector Conduction" (DCC) mode used at each crosspoint of the switching matrix of the invention, and the typical static collector voltage-current characteristics for that unit;

FIG. 28 shows a curve illustrating the use of the DCC junction transistor as a crosspoint device;

FIG. 29 is a curve illustrating the collector-voltage characteristic of the junction transistor operated at constant emitter current in a common base configuration used as the link termination device in the switching matrix of the invention;

FIG. 30 shows schematically a bias-controlled link-lockout circuit using a single junction transistor (DCC) per crosspoint;

FIG. 31 shows schematically the base-controlled link-lockout circuit employing a three-terminal junction transistor device as the crosspoint in the system of the invention; and FIGS. 32 and 32A respectively show characteristic curves for the crosspoint and link junction transistor used in the link-lockout circuit of FIG. 31.

Figure 1:
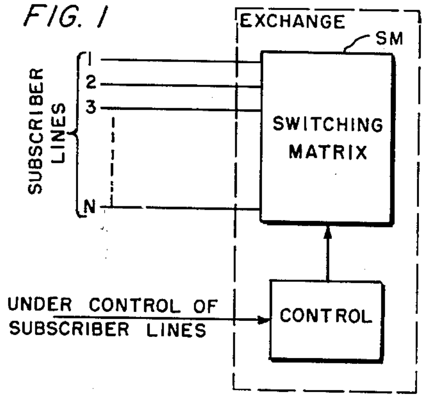
FIGS. 1 to 8 show diagrams used in connection with the general description of the novel features of the invention.

The description of the novel features of the switching matrix SM will be given in connection with the following figures, for simplicity, in terms of telephone parlance. With reference to FIG. 1, a number N of telephone subscriber lines have access to the switching matrix SM which is imbedded within the switching exchange represented by the dashed line box so labeled. The box labeled Control to which all of the N lines also have access forms the remainder of the exchange and will not be described here except to point out that the Control performs a certain operation on the switching matrix SM as indicated by the pointed arrow therebetween. For simplicity, in FIG. 1 and the following figures each subscriber line is shown on one wire rather than two wires which are actually necessary to convey electricity.

Figure 2:
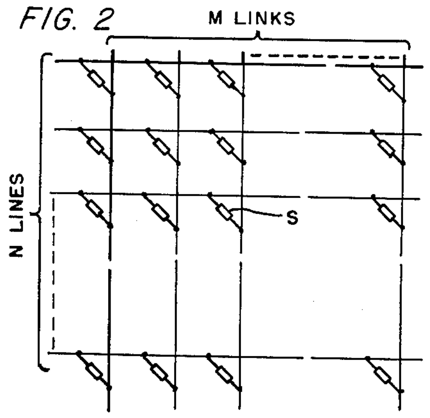

FIG. 2 shows the basic schematic of the switching matrix SM comprising N horizontal transmission lines and M vertical transmission links crossing each of the lines at separate points. At each of the NM points of intersection of the lines and links resides an electronic switch S, which is known as a "crosspoint." When a particular crosspoint S is in the "closed" condition, the associated horizontal line and vertical link are electrical connected together, and when the crosspoint is in the "open" condition, the associated line and link are not connected together electrically.

Figure 3:
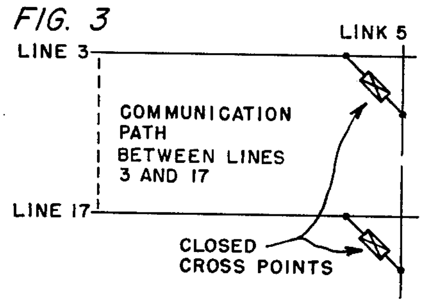

Suppose that it is desired to interconnect line 3 with line 17 and that link 5 is available since it is not "busy" with a prior interconnection. With reference to FIG. 3, if the crosspoints located at the intersections of lines 3 and 17 and link 5 are closed, then a path for the transmission of telephone voice signals will exist between lines 3 and 17 via link 5. It should be pointed out here that the number of links M to be used depends upon the expected traffic volume to exist in the exchange; the more links that are used, the more conversations or interconnections can exist simultaneously.

The heart of the switching matrix SM is the crosspoint itself. The crosspoint contains a memory property. In short, it is a bistable switch or a "flipflop." A flipflop is defined as a bistable device which has two stable states, which may be referred to as the "ON" or closed state and the "OFF" or open state. A flipflop is switched from one state to another by merely applying a short duration triggering pulse. The application of the trigger pulse causes the flipflop to change state; when the trigger pulse is removed, the flipflop remains in the new state.

Figure 4:
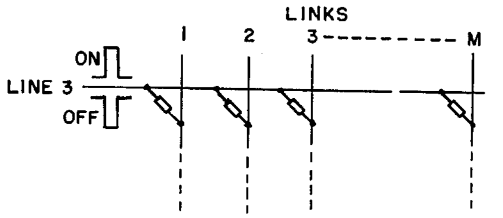
Figure 5:
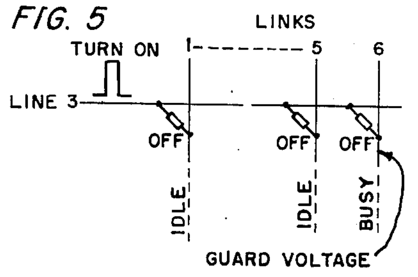
Figure 6:
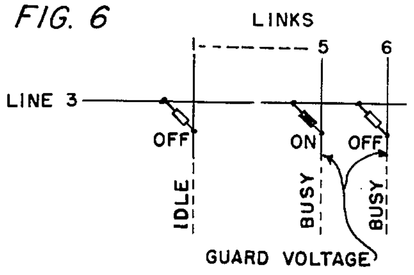

The second important feature relates to the lockout property possessed by the array of all M flipflops which are attached to any given horizontal line. Referring to FIG. 4, any one of the crosspoints S shown attached to a line 3 can be turned ON by means of the upward-going ON pulse applied to that line. Similarly, any crosspoint can be turned OFF by means of a downward-going pulse applied to the line to which it is connected. The lockout property comes into play in the following manner: As shown in FIG. 5, if a turn-on pulse is applied to a given line, say, 3 (assuming all crosspoints are OFF), one and only one crosspoint will turn on, i.e., the negative resistance associated with each bistable crosspoint S insures that only one crosspoint turns ON. The particular crosspoint that turns ON is said to be in a "slightly preferred" condition—this may be due to normal variations from crosspoint to crosspoint. The more nearly the crosspoints are alike in their characteristics, the more likely a turn ON pulse will turn ON any crosspoint at random.

Let it be assumed that link 6, say, is busy with other traffic in the office. In this event, as shown in FIG. 5, a "guard" voltage is automatically placed on link 6 such that none of the idle crosspoints on this link can be fired. For example, if a turn ON pulse is applied to line 3, we are assured that the crosspoint of line 3 and link 6 will not turn ON, that is, it is in a highly unpreferred condition due to the guard voltage. Similarly, if any other links are busy, the crosspoints at the intersection of line 3 and all the busy links will be unpreferred and none will have an opportunity to turn ON. In this manner, when a new call arrives at the exchange, an idle link is automatically selected and seized for use. In the case described above, we may say that line 3 gains access to link 5, if the turn ON pulse applied to the 3rd horizontal line causes the 5th crosspoint to turn ON. Since link 5 is now known as a busy link, a guard voltage is automatically placed on it which will prevent it from being seized by a turn ON pulse applied to any other horizontal line in the matrix. The situation described thus far is shown in FIG. 5.

Figure 7:
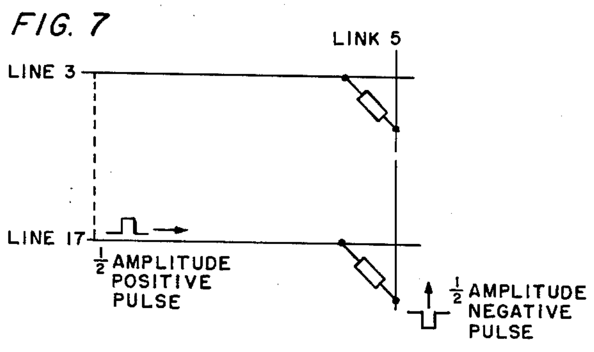

If we now desire to connect line 3 to line 17 via link 5, the following must be done: Since link 5 is in the "busy" or guarded condition, the application of an ordinary turn ON pulse to line 17 would surely not tend to turn ON the crosspoint at the intersection of line 17 and link 5. In fact, it would tend to turn ON one of the other crosspoints on line 17, resulting in an erroneous connection. It therefore becomes necessary to temporarily place link 5 in the "unguarded" condition. Even in this condition, the application of an ordinary turn ON pulse would not turn ON the desired "crosspoint." Finally it is necessary to temporarily place link 5 in the so-called "super-preferred" condition. This is done by applying to link 5 (from the Control) a negative-going pulse of essentially ½ the amplitude of a turn ON pulse. At the same time, in order to uniquely select the desired crosspoint, a positive-going pulse of ½ the amplitude of an ordinary turn ON pulse must be applied to line 17. The two ½ amplitude pulses add up to produce an operating pulse at the desired crosspoint and only at that crosspoint. In this manner, the crosspoint at the intersection of line 17 and link 5 is turned ON and the desired connection between lines 3 and 17 is completed. This situation is shown in FIG. 7.

Figure 8:
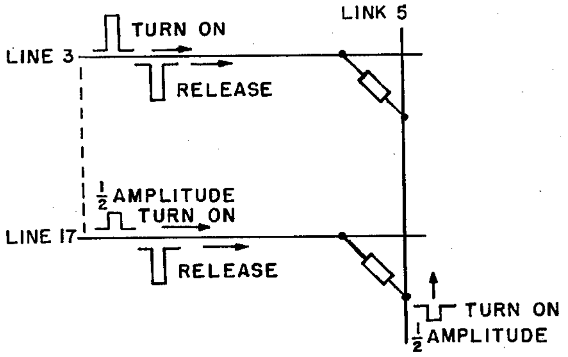

The pulsing conditions described in the preceding paragraphs are redrawn in FIG. 8 for convenience.

It should be noted that during the time link 5 is placed in the super-preferred condition by the application of a ½ amplitude pulse to the link, it is necessary to insure that no new calls are placed in the matrix. If a turn ON pulse were applied to line 12, say, during this period, this pulse would find the link 5 in the super-preferred condition and would cause the crosspoint at the intersection of line 12 and link 5 to turn ON, thus setting up an undesired or erroneous connection. The simple means for preventing this means from arising are contained within the Control shown in FIG. 1, to be described later in connection with subsequent figures of the drawing.

The techniques described above do not require the use of separate physical line allotter and line finder units. The function of such units are instead contained inherently in the action of the lockout matrix and the manner of controlling this matrix. In fact, the alloting and line finding action takes place simultaneously in response to a request for service by a subscriber associated with any one of the lines transmitted to the crosspoints attached to that line. The idle negative resistance crosspoints on a given horizontal line simultaneously compete with one another for breakdown voltage. The network is designed such that the breakdown voltage of an idle link tied to a busy line is greater than the applied marking voltage, and the crosspoint is thus prevented from firing. The existence of the allotting (and selecting) mechanism as an integral part of the properties of the crosspoint array require that the crosspoints have closer tolerances than might be necessary for a network, say, in which this interplay or coupling between crosspoints were reduced. As a result of this negative resistance crosspoint property, an originating request for service by subscriber A is handled by the system, as previously described in connection with FIGS. 1 to 8, by simply generating the pulse in A's line circuit which causes one and only one crosspoint (attached to an idle link to turn ON). This is known as "horizontal lockout." The remaining crosspoints are excluded from firing. When the A cross point turns ON certain voltage conditions, known as vertical lockout, are established on the link which prevent it being seized by any other subscriber in a request for service. At this juncture, the system has knowledge of the address of the called subscriber and the location of the link seized by A. The B crosspoint is turned ON by simultaneously pulsing B's line circuit and the seized link. The combination of the two pulses insures that only the desired crosspoint will fire. All other crosspoints on B's horizontal line and the vertical seized link receive essentially half excitation and do not turn ON.

Figure 9:
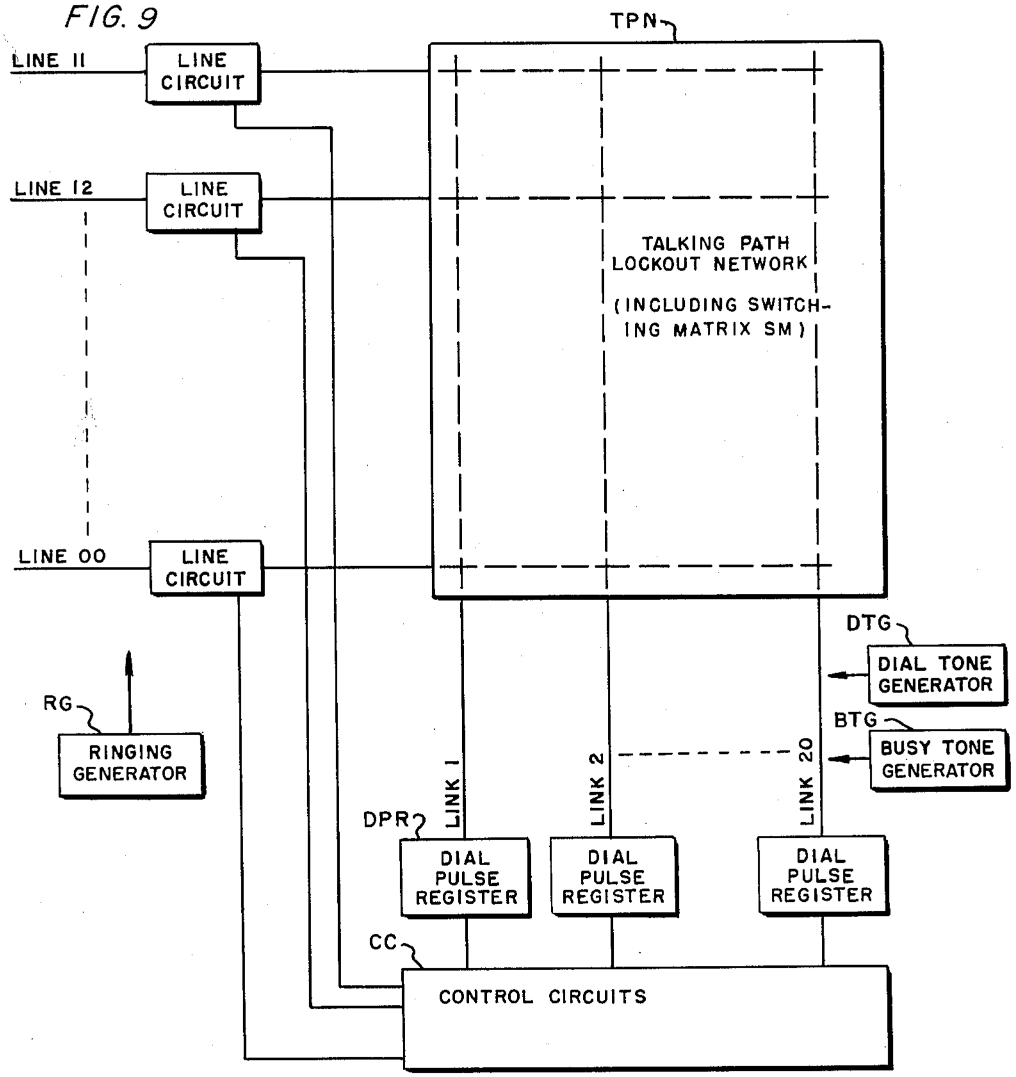
FIG. 9 shows diagrammatically the basic automatic switching plan used in the system of the invention.

The basic automatic switching exchange plan used in the system of the invention is shown diagrammatically in FIG. 9. The system, as shown, accommodates 100 subscriber lines and allows a maximum of 20 simultaneous conversations although there are no fundamental numbering restrictions which limit the exchange to this size. In principle, the number of lines and number of maximum simultaneous conversations (or links) can be varied as desired.

With reference to FIG. 9, each subscriber line has access to the system via a Line Circuit. The interconnections between subscribers are made in the talking path network TPN which includes the switching matrix SM. A plurality of links each including an individual dial pulse register DPR also has access to TPN. The dial pulse registers DPR's are coupled to the line circuits by control circuits as shown including an associated dial tone generator DTG, a busy tone generator BTG and a ringing generator RG. An originating request for service in this network by a subscriber is extended through the line circuit to the talking path network TPN resulting in the seizure of an idle link by automatically closing the appropriate crosspoint switch in the switching matrix SM. Dial tone is then transmitted back to the subscriber through the line circuit and the TPN and the dial pulses are stored in the appropriate dial pulse registers DPR. When dialing is completed, the contents of the DPR are inspected and translated in the control circuit to indicate the location of the called subscriber's line circuit. The state of the called line is then interrogated; if idle, ringing signal is placed on the called line and the TPN crosspoint connecting the called line to the seized link is operated. The TPN connection is locked in and requires no further supervisory control. Upon completion of the message, the line circuit generates signals which release the held crosspoints. If the called line is busy, the control system is notified and Busy Tone is applied to the seized link.

Figure 10:
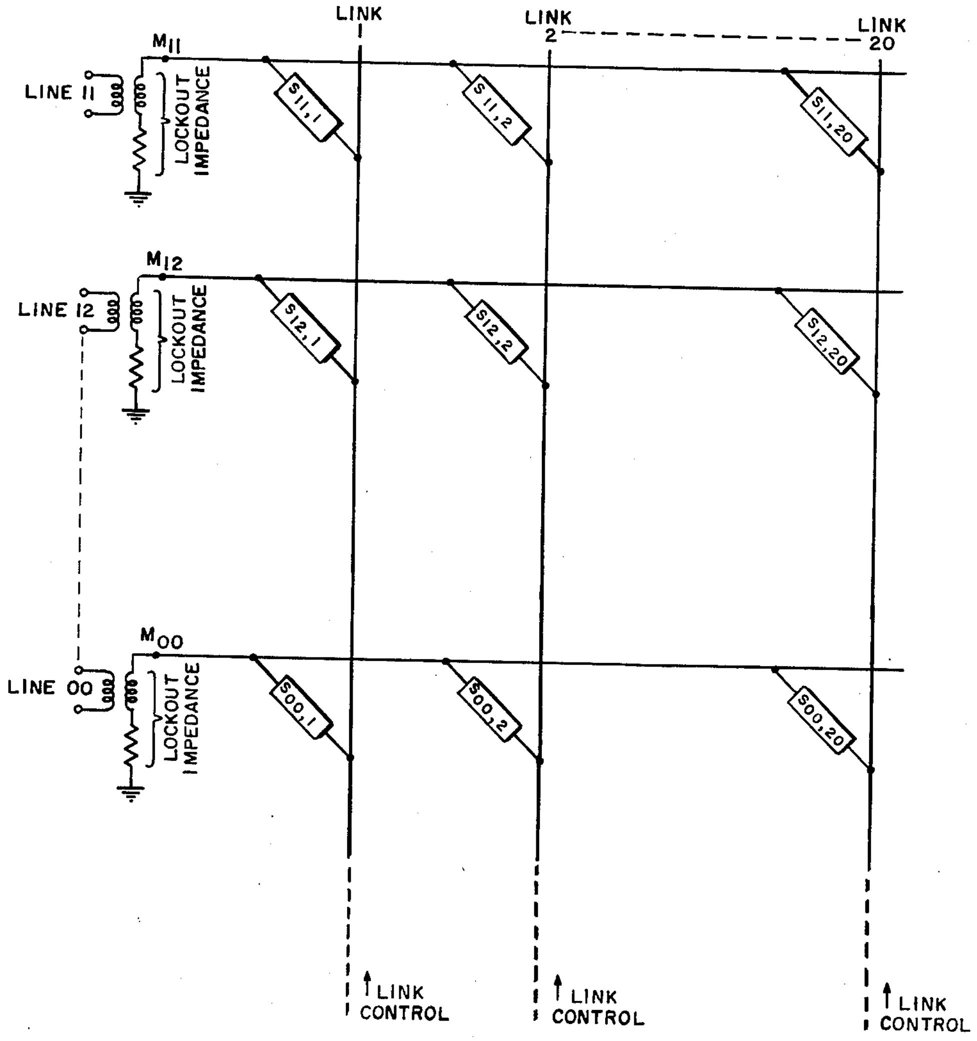
FIG. 10 shows a simplified version of the switching matrix embodying the invention.

FIG. 10 shows a simplified version of the switching matrix SM included in TPN. It consists of a rectangular matrix of 100 horizontal lines and 20 vertical links. Each of the 100 lines can be connected to or is given access to each of the 20 links by means of a "crosspoint" switch S located at each intersection of the lines and links. The crosspoint switches S display a negative resistance property between their line and link terminals when being switched from the "OFF" to the "ON" state. The negative resistance in conjunction with the circuit voltages and the common lockout impedance tends to permit one and only one switch in a given row or column to break down and conduct. In the OFF state, the series switch presents a high impedance to the signal transmission path; and in the ON state, it presents a low signal impedance. Each crosspoint $S_{x,y}$ gives line $x$ access to link $y$, etc. An interconnecting path between the subscribers A and B is completed by closing crosspoints $S_{A,y}$ and $S_{B,y}$, where $y$ denotes a particular link. A transistor crosspoint in the low conduction state rejects audio signal transmission between the line and link; and in the high conduction state, it provides good transmission between the line and the link.

Assume that line #11 has originated a request for service. A pulsed voltage mark will then be applied at the point $M_{11}$. The voltage existing on all the busy links will be such that the marking voltage applied will not be sufficient to fire the switches S connected to the busy links. The voltage difference between the marking voltage and the voltage existing on an idle link is sufficient to fire the switches connected to the idle link. The latter switches then compete for firing voltage and their negative resistance characteristic along with appropriate external circuitry insures that only one switch will be fired. Assuming that link #2 is seized, the link #2 control circuit, indicated at the bottom of FIG. 10, causes dial tone from the associated dial tone generator DTG (FIG. 9) to be placed on the link and transmitted to the calling line via the fired crosspoint. The new link voltage condition makes the link busy to succeeding calls. The dial pulses are then routed to the link and the DPR via the fired switch $S_{11,2}$. The control circuits then perform the connector action which results in a mark being applied to point $M_{12}$, assuming line #12 is being called and is idle. As the same time that line #12 is marked, the voltage on link #2 is altered such that the switches attached to link #2 are in a "super-preferred" breakdown condition and $S_{12,2}$ will fire, completing the talking path connection. The "super-preferred" condition is necessary to give the link #2 switches clear preference over any other switch in the matrix which may otherwise have a high preference rating due to manufacturing variations, etc. The locked-in switches are held operated under control the the subscribers and are eventually released by reverse polarity marks applied at $M_{11}$ and $M_{12}$, initiated by a cessation of looped current. The reverse polarity marks reduce the available voltage across the switches below the sustaining value which extinguishes the conduction therein and returns the switches to the "OFF" condition.

In order to insure that two or more marks are not applied simultaneously to the matrix, each line circuit is assigned, in the manner to be described later, an individual time slot within a 100 slot synchronous frame. In this manner, marking voltage is applied to a line only during the time slot assigned to the line. The asynchronous originating traffic requests are temporarily stored in the line circuit and are then operated upon in a synchronous fashion.

FIG. 11 shows the block diagram of the basic system plan of FIG. 9 in more detail. For simplicity, it contains only two line circuits, #11 and #00, and one link circuit #1. However, it will be recalled that there are 100 identical line circuits and 20 identical link circuits in the system. Other components shown in FIG. 11 are the 100 x 20 lockout switching network TPN including the switching matrix SM, the interrogating translator IT associated with a dial pulse register DPR (one of 20), the busy-not busy buffer matrix BM, two pulse distributors (a 20-step link distributor LD and a 100-step originating mark distributor OMD), and three supervisory signal generators (dial tone generator DTG, busy tone generator BTG and ringing generator RG) associated with the link control circuit LCC. Several units, such as a master timer to be referred to later, the various power supplies and amplifiers are omitted in this diagram.

Before going into details of the logical operation, it will be convenient in connection with FIG. 11, to trace a call originated by line #11 for line #00. (1) When subscriber #11 goes to the OFF-hook condition, line circuit #11 behaves as a calling line circuit, detects the request of a call from subscriber #11 and generates an A mark on the 11th horizontal line of the switching matrix SM. (2) In the switching matrix SM, the A mark fires one and only one of the idle crosspoint devices on the 11th horizontal line, the A crosspoint, thus allowing subscriber #11 to seize a link and have access to its link circuit. (3) Each link circuit consists of a link control circuit LCC and a dial pulse register DPR. The link control circuit acts as a master unit after the link is seized and proceeds to function in accordance with a built-in program. The link control circuit detects the seizure of the link and causes dial tone to be placed on its link which reaches subscriber #11 via the A crosspoint and line circuit #11. (4) Subscriber #11 then proceeds to dial #00 and the pulses are steered to the dial pulse register under the supervision of the link control circuit. (5) Upon the completion of the dial pulse registration, the link control circuit causes the contents of the dial pulse register to spill out and be transferred to the interrogating translator IT. (6) The interrogating transistor IT is shared by all 20 link circuits on a time division basis; it translates the 2-out-of-20 dial code into a 1-out-of-100 line circuit address code. Thus, line circuit #00 is selected and notified by an interrogating pulse that it is being called. (7) Assume the called line is idle. Upon notification by the interrogating translator IT, the idle line circuit causes a ringing signal to be placed on line #00. (8) At the same time, line circuit #00 notifies the engaged link circuit of its idle state by returning a Not Busy Pulse through the busy-not busy buffer matrix BM. Upon receipt of this pulse, the link circuit places a link B mark on the seized link. Simultaneously, line circuit #00 places a line B mark on the 100th horizontal line of the switching matrix SM. These two marks combine to select and turn ON the unique crosspoint, the B crosspoint, which gives subscriber #00 access to the seized link. Thus, the complete talking path is established, and a portion of the ringing signal is sent back through the talking path via the B and A crosspoints to the calling subscriber as a ring-back signal. The busy-not busy buffer matrix BM is shared by all the line circuits and link circuits on a time division basis. (9) As soon as the called subset goes into the OFF-hook condition, the ringing signal is retired and conversation can begin. When the message is completed, both subscribers revert to the ON-hook condition. Both line circuits are released by the cessation of D.C. loop current, and both line circuits generate release marks which turn OFF the respective crosspoints. The link circuit is released as soon as the first crosspoint is released. The release program is essentially the same in the event that the called subscriber fails to answer. (10) If the called line #00 is busy, the called subscriber's set is either OFF hook or ringing. In this event, the called line circuit #00 will not respond to the interrogating pulse. (11). Since the link control circuit does not receive a "not-busy-pulse" from the called line circuit, it places busy tone on the link which reaches the calling subscriber via the A crosspoint and line circuit #11. The release procedure when the calling subscriber hangs up is the same as in the previous case.

Because of the characteristics of the lockout switching network, if more than one subscriber requests service simultaneously (causing several A marks to be placed in the switching matrix SM simultaneously), these subscribers might be inadvertently connected. To eliminate this, the originating mark distributor OMD is used to insure that only one A mark can occur at a time. The originating mark distributor allots an operating time slot to each line in time sequence which allows an A mark from a given line circuit to take place only during the allotted time slot. In the same manner, a link distributor LD allots an operating time slot (link distributor pulse) to each link in time sequence to eliminate the simultaneous occurrence of two or more B marks in the switching matrix which might cause misconnections between the marked lines, and the simultaneous use of interrogating translator IT and busy-not busy buffer matrix BM which are employed commonly by all the link circuits on a time sharing basis. Finally, to eliminate the simultaneous occurrence of an A mark and B mark which may also cause misconnections between lines, these marks are arranged to be out of phase with each other.

Figure 12:
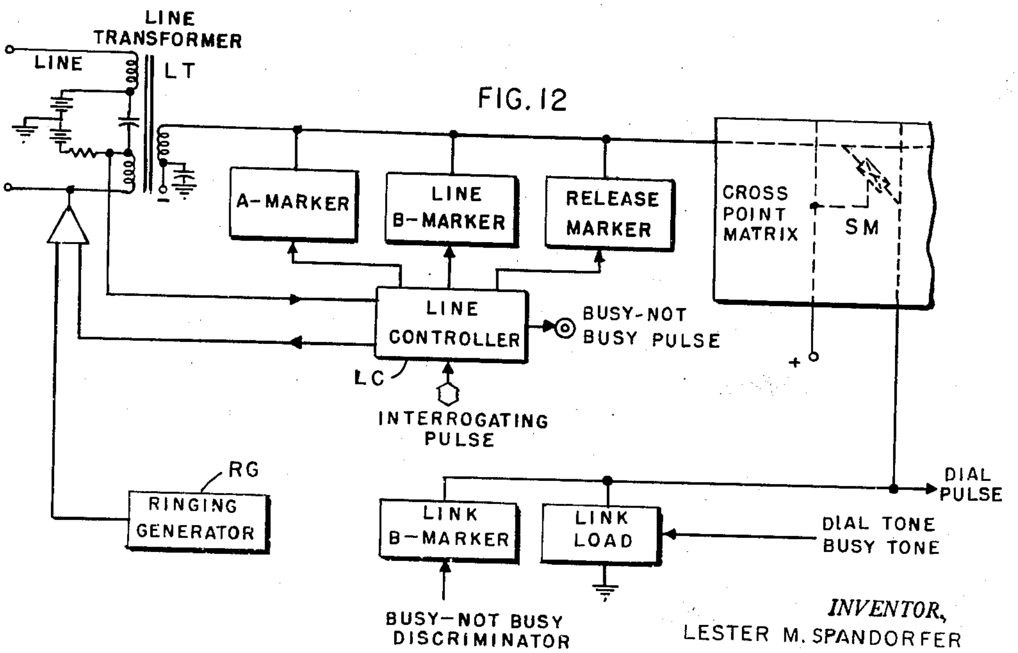
FIG. 12 shows a general plan of the marking arrangement for controlling the operation of the crosspoints in the switching matrix of the invention.

*Line Circuit.*—The block diagram of the line circuit shown in FIG. 12 consists of a line transformer LT, a line controller LC and three markers A, B, and Release. The line circuit has access to the subscriber's line, ringing generator RG, switching matrix SM, interrogating translator IT, and busy-not busy buffer matrix BM, and the originating mark distributor OMD (FIG. 11). Its operation will be described later.

Figure 13:
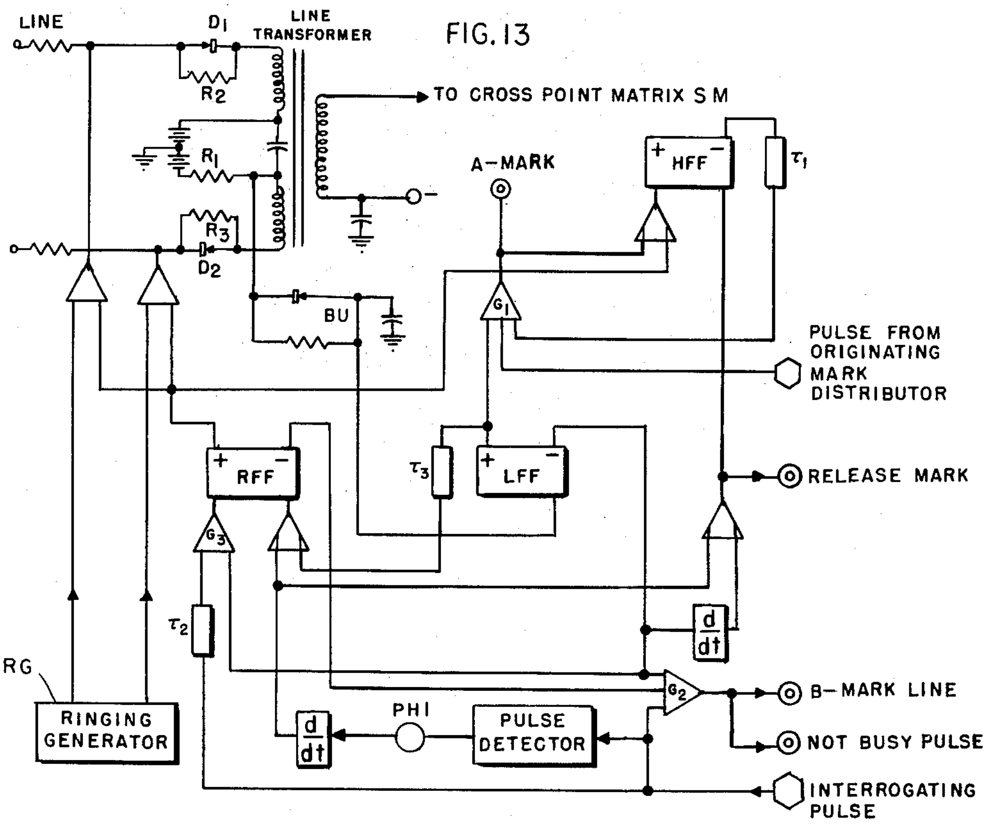
FIG. 13 shows schematically the line controller used to show the logical operation of a line circuit in controlling the crosspoint switches in accordance with the invention.

FIG. 13, the Line Controller, is provided to show the logical operation of the line circuit. When the line circuit is in an idle condition, all the supervisory flipflops are in reset condition. This flipflop may be of the well known Schmitt bistable multivibrator type disclosed in FIG. 5–17 of the book "Pulse and Digital Circuits" by Millman & Taub, published in 1956 by the McGraw-Hill Book Co., Inc., or equivalent transistor device. The connections between the apparatus in FIG. 13 are indicated by the following description of its operation.

For the sake of logical clarity, the following is assumed:

(a) All pulses employed are positive going unless otherwise stated.

(b) In all the supervisory flipflops of the system, the positive pulse applied at the left bottom sets the flipflop and the positive pulse applied at the right bottom resets it. In set condition, the left top terminal of the flipflop gives a higher output voltage level than the right. In reset condition, the relative height of the output level is reversed.

(c) All the amplifiers are omitted.

*Originating a Call.*—With reference to FIG. 13, when the subscriber takes his subset off-hook, the D.C. current change in the line causes a potential drop across the D.C. loop supervisory resistor $R_1$. The potential drop is sent through a buffer circuit BU to a line flipflop LFF and turns it ON. AND gate $G_1$ dispatches an A mark to the A marker when and only when the following occurs: (1) LFF is ON, (2) the sequence control flipflop HFF is OFF and (3) an originating mark distributor pulse is present. This A mark at the output of $G_1$ also sets HFF and, after a time delay determined by delay line $\tau_1$, which is chosen longer than the omdp pulse but shorter than one frame of 100 omdp pulses, the output of $G_1$ is shut off, thus preventing the repetition of the A mark in this line circuit. Since the turning ON of LFF is not synchronized with the occurrence of the omdp pulse, it is possible that LFF turns ON after the leading edge of the omdp pulse has occurred but prior to the occurrence of the trailing edge. In this event, gate $G_1$ might function improperly, either turning ON HFF without properly applying the A mark to the A marker, or vice versa. In any case, this hazard can be eliminated by good circuit design. In the worst case, the A mark is not long enough to fire a crosspoint, but the probability of this happening is about once in 400 attempts. The necessary subscriber measure to correct this situation is to hang up and try again. The purpose of the buffer BU is to eliminate the effect of dialing on the LFF. When the input of the buffer goes down due to the off-hook condition, the output follows quickly; when positive dial pulses arrive, the buffer does not transmit the dial pulses. When the subscriber reverts to the on-hook condition, the input of the buffer goes up and its output gradually follows to turn LFF OFF.

*Idle Line Receiving a Call.*—When it is desired to complete a call to an idle line, the associated line circuit receives interrogating pulses from the interrogating translator IT. The interrogating pulses continue to enter the line circuit until the line circuit is released at the termination of the connection. It is desired, however, that only the first interrogating pulse be developed into a B mark and a "not busy pulse." RFF is used to lock out succeeding interrogating pulses. RFF, which is originally reset, is set by the first interrogating pulse. Once set, RFF supplies a negative going bias to $G_2$ which inhibits further transmission through $G_2$. Delay $\tau_2$ (<2 interrogating pulse width) prevents RFF from being set before the first interrogating pulse has retired. The "not busy pulse" is sent back through the busy-not busy buffer matrix to the engaged link controller which, in turn, generates the link B mark. The line B mark signal and the link B mark fire the second, or B crosspoint, to complete the talking path. The left-hand output of RFF gates ringing signal from the signal generator RG on the line. The ringing signal is biased in such a way that it will not go through diodes $D_1$ and $D_2$, thus effectively preventing ringing signal from getting into the switching matrix SM. However, $R_2$ and $R_3$ in shunt with those diodes are provided to let a small portion of the ringing signal get into the switching matrix as ring-back tone. Another function of RFF is to turn ON HFF so as to prevent the generation of an A mark; otherwise, when the called subscriber answers and the LFF turns ON, an A mark will inadvertently be generated. When the subscriber answers and LFF is turned ON, the left-hand output of LFF resets RFF through delay $\tau_3$ since ringing is no longer needed. The delay is provided to allow the right-hand output of LFF to inhibit $G_2$ before RFF is reset and loses control over $G_2$. $G_3$ is provided to prevent the interrogating pulses from turning RFF ON again after LFF turns it OFF. Delay $\tau_3$ is also used to eliminate this race condition.

*Busy Line Receiving a Call.*—In case of a busy line circuit, either RFF or LFF is ON. Therefore, the interrogating pulse will not get through $G_2$ and consequently neither the line B mark nor the "not busy pulse" is generated. If LFF happens to be ON, the interrogating pulse is inhibited by $G_3$ from setting RFF. If RFF is ON, and the called line is ringing due to prior traffic, the interrogating pulse does not affect RFF after getting through $G_3$. Thus, the link circuit does not receive a "not busy pulse," and it proceeds to place busy tone on the link.

*Release.*—There are two conditions where the line circuit release operation is required.

(a) The first condition is after the completion of the conversation. Upon completion, each subscriber hangs up and each LFF is turned OFF. The right-hand output of the LFF is differentiated, and the resulted spike is used as a release mark which releases the crosspoint held by the line circuit. It should be noted that the two release marks can, of course, occur asynchronously. The same spike is used also to reset HFF whereupon the entire circuit is returned to the idle condition. When one of the two engaged crosspoints is released, the engaged link circuit is released and the interrogating pulses cease.

(b) The second release conditon is after an idle line is called but the called subscriber fails to answer and the calling subscriber hangs up. At this point, RFF and HFF in the called subscriber's line circuit are turned ON and the crosspoints are ON. The calling subscriber's line circuit and the A crosspoint are released as described in the previous paragraph. Since the called subscriber in this case has no control over his line circuit, the release of his line circuit and the B crosspoint must be achieved by a different approach. When the A crosspoint is released, the link circuit and, in particular, the interrogating pulses are retired. The cessation of the interrogating pulse is detected by the pulse detector in the called line circuit. The detector output is used to originate the release mark which resets HFF, LFF and the B crosspoint.

*Outline of Marking Scheme.*—Details of the marking scheme will be given later in the specification. The general plan of the marking arrangement is shown in FIG. 12. The A marker, B marker and release marker are independent of each other in their operation. An A mark signal of the line controller LC actuates the A marker which marks the horizontal line and fires a crosspoint. When the line is called by another subscriber, the line B marker and the link B marker are actuated at the same time, thus selecting and firing only the desired crosspoint. When the connection is to be terminated, the release marker releases the engaged crosspoint. Except during the marking period, the three markers present a high impedance between line and ground, thus preventing unnecessary bridging transmission laws.

*Link Circuit.*—The general block diagram of the link circuit is shown in FIG. 14. The link circuit comprises the dial pulse register DPR and the link control circuit LCC of FIG. 11. The link circuit has direct access to the switching network interrogating translator IT, busy-not busy buffer matrix BM, busy tone generator BTG, dial tone generator DTG, and link distributor LD. As shown in FIG. 14, the link control circuit is connected to several functional devices in the link circuit, namely the link load, link B marker, dial pulse register DPR, link controller LC, and link reset pulse generator LRPG. During voice transmisison time, it is desired that the link circuit present a high audio impedance between link and ground in order to minimize insertion loss. In the design of these circuits, attention must be given to realizing high input impedances.

*Link Load and Link B Marker.*—There are two functions of the link load. First, it plays a key role in the switching action of the lockout switching matrix SM. The link load guards the link by causing the voltage level of the link to be shifted when the link is seized by a line so that none of the remaining 99 crosspoints on the link can be fired by subsequent A marks from other line circuits. The second function of the link load is to serve as a path for dial tone or busy tone from the respective generators to the link where required. To minimize insertion loss, the link load presents a high A.C. input impedance between line and ground after the A crosspoint is fired.

The purpose of the link marker is to place a positive going B mark on the line synchronously with the line B mark. The crosspoint at the point of coincidence of the line and link B marks in the switching matrix will be fired to complete the talking path connection. The output circuit of the link B marker is so designed that the A.C. impedance to ground is high when the B mark is absent. The circuit description of the link load and line B marker is given later.

*Coupling Circuit.*—The device inclosed by a broken line rectangle in FIG. 14 is called the coupling circuit and has two main functions. The first is to couple the dial pulse register DPR and the link controller LC to the link during the period when dial pulses are sent from the link to these units, and cut these units off the link during conversation time in order to maintain high link to ground impedance. Flipflop FF is reset before the link is seized and remains reset until the B mark time. Therefore gate $G_1$ is open and the dial pulses and other signals appearing on the link are transmitted through circuit C and gate $G_1$ to the dial pulse register and link controller. By the time the B mark occurs, all necessary communication between the link and the dial pulse register and the link controller has taken place and the link circuit can be cut off from the link. Therefore, the pulse from the busy-not busy discriminator BD sets FF in synchronism with the B mark. When set, FF removes the input of $G_1$. Gate $G_1$ is so designed that when the input from FF is removed, it presents a very high impedance between link and ground. FF remains set until the release of the link circuit. Thus, a high impedance is maintained during speech transmission between link and ground.

The second function of the coupling circuit is to transmit a signal from the link to the link reset pulse generator LRPG to indicate that either the A or B crosspoint has been released. This signal causes this generator to reset the link circuit upon the termination of the connection. As mentioned above, FF is set by the occurrence of a B mark. The delay time or the delay unit $\tau_1$ is chosen longer than the B mark. Therefore, one of the two inputs of the AND gate $G_2$ is made available from the left-hand output of FF when the B marker is terminated. The remaining input circuit of $G_2$ is so designed that the speech signal level is not large enough to reach the threshold level and cause transmission to $G_2$. Thus $G_2$ presents a necessary high impedance and produces no output until the next occurrence of a substantial pulse on the link. When either of the A or B crosspoints is finally released, a positive going voltage level change takes place on the link which is large enough to go through $G_2$. In this manner, a pulse gets through $G_2$ for the first time since the link has been seized and reaches the link reset pulse generator LRPG. This generator forms a reset pulse which resets all of the flipflops in the link circuit including the FF of the coupling circuit. Due to the delay line $\tau_1$, a sufficient duration of the crosspoint release transient is extended to $G_2$ to the link reset pulse generator to allow the generation of a full size reset pulse even if FF is reset by the leading edge of the reset pulse.

Figure 15:
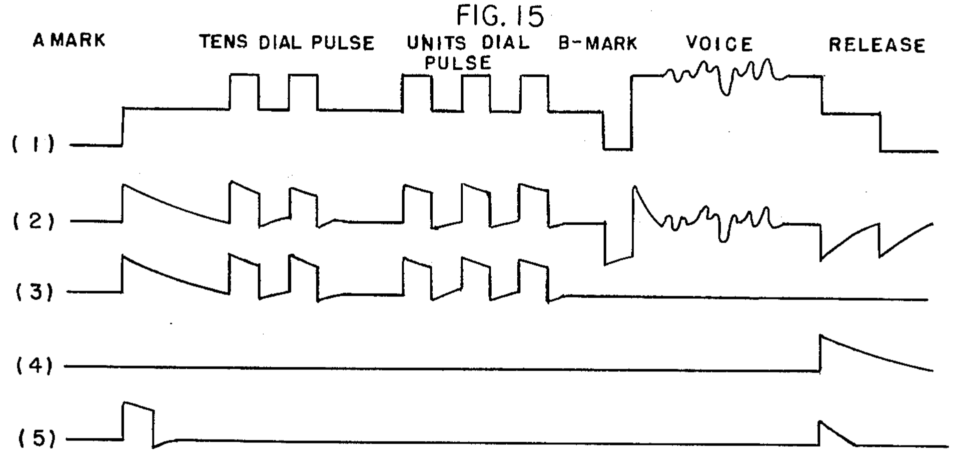
FIG. 15 shows the waveforms of the controlled waves which are transmitted to the dial pulse register, the link controller, and the link reset pulse generator, at various points in the link circuit of FIG. 14.

*Link Circuit Waveform.*—The operation of the dial pulse register, the link controller and the link reset pulse generator is based upon the waveforms which are transmitted to these units from the link via the coupling circuit. The waveforms are shown in FIG. 15. Numbers denote corresponding points in FIG. 14 where the waveforms are observed. Waveform (1) shows the waveform on the link. As soon as one crosspoint on the line is fired by an A mark, the link load brings the voltage level down. It is required that the polarity of the dial pulse be in the same direction as the voltage change on the link when the A crosspoint is turned ON. The polarity of the line transformer is chosen such that the dial pulse polarity satisfies this condition. Since the convention is to consider all pulses as positive going, waveform (1) is shown in reverse polarity. Consequently, the voltage level change due to the A mark is shown as positive in FIG. 15. After the A mark, the tens dial pulse train and the units dial pulse train, to be referred to later in connection with the designs of the dial pulse register, follow. If the called line is idle, the B mark is placed on the line and link. The B mark polarity is opposite the dial pulse polarity. After the B mark, the link voltage level is lower than its original level and the connection is completed. When the conversation is over, the A and B crosspoints are released and the link voltage level returns to the idle level in two steps which correspond to the individual release transients of the A and B crosspoints. If the called line were busy, a B mark in one of the crosspoint release steps would not occur.

Waveform (1) is transformed into waveform (2) by circuit C in the coupling circuit. Circuit C is an ordinary coupling circuit of suitable time constant. Waveform (2) is transmitted to gate $G_1$ and the link reset pulse generator. The B mark does not go through $G_1$, and $G_1$ is closed by FF after the occurrence of the B mark. Therefore, the output form of the gate $G_1$ becomes (3) of FIG. 15. The wave (3) is sent to the dial pulse register and the link controller. Gate $G_2$ transmits only the waveform on the link caused by the release of the first crosspoint. The output of $G_2$ is shown as (4). Wave (4) is sent to the link reset pulse generator; thus, the link reset pulse generator operates in response to waves (2) and (4). Dial tone and busy tone are filtered out by circuit C in the coupling circuit and do not appear in waveforms (2) and (3). Dial tone and busy tone occur when FF is reset and do not get through gate $G_2$, as indicated by waveform (4).

Figure 16:
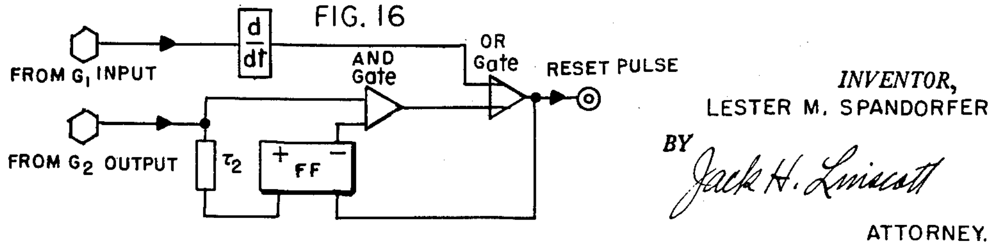
FIG. 16 shows schematically the circuit of the link reset pulse generator used in the link circuit of FIG. 14.

*Link Reset Pulse Generator.*—As a precautionary measure, the system is designed such that all flipflops in the link circuit are reset twice for each usage of the link. The first reset takes place when the link is seized by a line and the second when the link is released. The reset action insures that the link circuit is in the released condition despite possible static induction, power supply disturbances, etc. which may have occurred during the link idle period. The link reset pulse generator LRPG, as shown in FIG. 16, is provided to generate these reset pulses. Waveforms (2) and (4) of FIG. 15 go respectively from the link and gate $G_2$ of FIG. 14 to terminals 2 and 1 of FIG. 16. Waveform (2) is used to generate the reset pulse upon link seizure. The transient waveform caused by the A mark goes through an AND gate and an OR gate. After a time delay determined by a delay line, the A mark transient sets a flipflop. The output of the flipflop prevents further transmission to the AND gate. Thus, a reset pulse is formed at the output of the OR gate in FIG. 16. This is shown as the first pulse of waveform (5), FIG. 15. When one of the crosspoints on the link is released, waveform (4) caused by the release, is inverted in polarity and differentiated and comes out through the OR gate as a reset pulse. This same pulse is also used to reset the internal flipflop. These two reset pulses are extended to the dial pulse register, link controller, busy-not busy discriminator, and link B marker and resets the flipflops in these units at the beginning and end of their use. The reset pulses are shown in waveform (5), FIG. 15.

It should be noted that if the internal flipflop of the link reset pulse generator is inadvertently set during the link idle period, the reset pulse which occurs with link seizure will not be generated. However, if none of the other flipflops of the circuit have been inadvertently set during the idle period, the end circuit will operate properly. Failure will occur, of course, if any of the other circuit flipflops have been set. In this event, a reset pulse will be formed when the link is released and operation will proceed normally on the next occasion when the link is seized.

Figure 17:
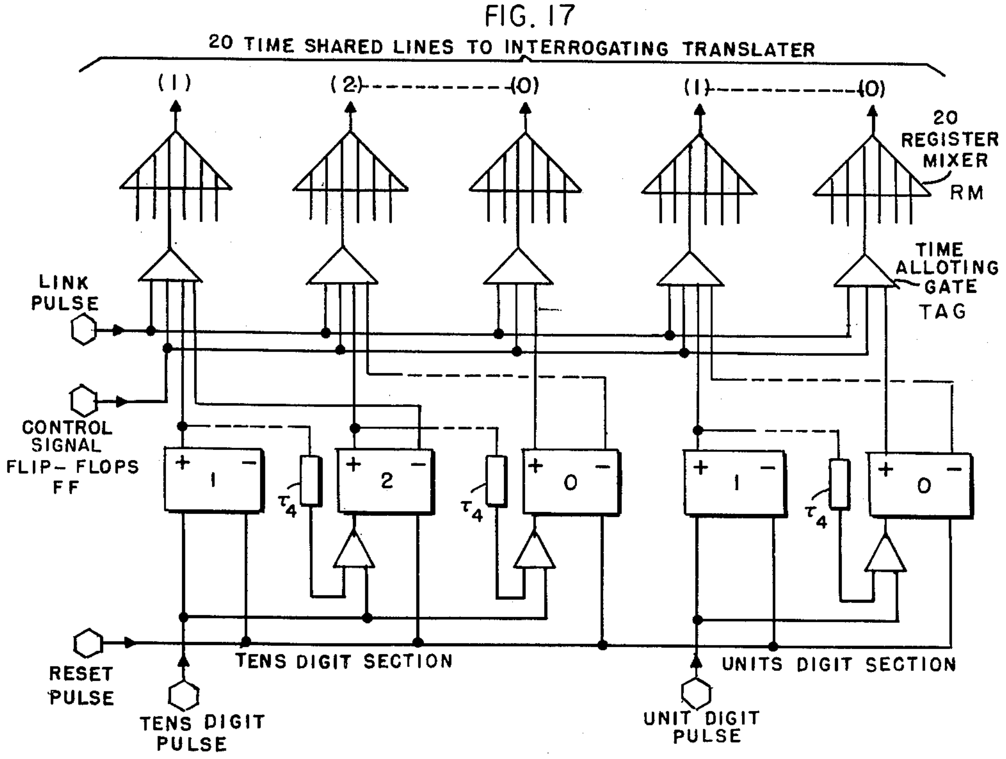
FIG. 17 is a block diagram of one design of the dial pulse register which could be used in the control circuit of FIG. 11.

*Dial Pulse Register.*—One possible design of the dial pulse register is shown in FIG. 17. It consists of a tens digit section and a units digit section, the logic of the two sections being identical. When the link is seized by calling line, the link reset pulse generator resets the 20 dial pulse register flipflops. The link controller opens a gate allowing the ten digit train of pulses to reach the dial pulse register. The first pulse of the tens train sets the first flipflop, which in turn opens the gate at the second flipflop. The operation is repeated until the end of the tens digit dial pulse. If the tens digit is 7, for example, 7 flipflops will be set at the end of the tens train. A delay line is inserted in the coupling between the output of one flipflop and the input of the next flipflop. The delay of this delay line is larger than the duration of a dial pulse; otherwise, there will be a danger that a single dial pulse will set more than one flipflop. Upon completion of the tens train, the link controller closes the gate which gives the train access to the dial pulse register, and opens another gate which allows the units digit pulse to reach the input terminal of the unit section. The registering operation of the unit section is the same as that of a tens section, and upon completion of the dial pulse registration, the link controller cuts off the input of the unit section.

The two outputs of each flipflop are respectively connected to two time-allotting gates, as shown in FIG. 17. when $n$ flipflops are set, the $n$-th, and only the $n$-th, time-allotting gate will give an output signal when the control signal and a link (distributor) pulse are applied to a dial pulse register simultaneously. The link distributor pulse is applied during the time slot which is allotted to the link circuit by the link distributor. The link controller sends the control signal to the time-allotting gate after completion of dial pulse registration. The control signal is sustained until a link circuit is released, when the connection is terminated. Therefore, during the period between the end of the dial pulse registration and the release of the link at the end of a call, two time-allotting gates, one each for the tens digit register and the unit digit register, will give a continuous train of output pulses in synchronism with the link distributor pulses allotted to the link. In the case where the number of the called party is 32, for example, the third time-allotting gate connected to the tens digit register and the second time-allotting gate connected to the units digit register will give outputs.

The outputs from the $n$-th time-allotting gates of the twenty dial pulse registers in the system are put into a 20-input OR gate. This OR gate is called a 20-register mixer, and its circuit is shown in FIG. 17. Since there are twenty time-allotting gates in a dial pulsing register, there are twenty 20-register mixers in the entire system. Since each link circuit is allotted a link distributor pulse during its time slot which is out-of-phase with the operating time slots of the other nineteen link circuits there will be no interference in the mixers between signals from the 20-dial pulse registers. The twenty outputs of the 20-register mixers are dispatched to an interrogating translator.

*Link Controller.*—The function of the link controller is to control the sequence of operations of the link circuit, as indicated by waveform (3), FIG. 15. It will be recalled that this waveform is the result of changes in link voltage level during the use of the link. FIG. 18 shows the link controller along with some of the waveforms (FIG. 18A) which are produced during this operation. When the link is seized by a line, a reset pulse resets the synchronizer flipflop FF and turns the counter back to 0 and the remainder of its stages OFF. The sequence waveform (1) of FIG. 18A is the output of gate $G_1$ of FIG. 14. The first transient waveform due to the A mark gets through the gate $G_1$ of FIG. 18 and sets the mono-stable flipflop CH which serves as a chronometer. After recovery time $\tau_1$, CH flips back to its original state. The output of CH is shown as sequence waveform (2). This output waveform is differentiated and the resultant positive spikes, shown in sequence waveform (3), are used to advance the counter. The first spike causes stage 1 to give an output. Stage 1 of the counter is connected to the tens digit dial pulse gate $G_2$, FIG. 18, and dial tone gate $G_3$, FIG. 14. The dial tone gate is accordingly opened and dial tone is placed on the link through the link load and the calling subscriber can begin dialing. Since the tens digit dial pulse gate $G_2$, FIG. 18, is open, the dial pulse register is ready to receive the tens train of pulses. The chronometer cannot flip back to its initial state during the pulse train. $\tau_1$ is chosen to be slightly greater than the period of dial pulses within a train and, therefore, it cannot reset between consecutive pulses. Therefore CH flips back $\tau_1$ seconds after the end of the tens digit dial pulse train, and the resulting waveforms will advance the counter to stage 2. The output of stage 2 allows the units digit dial pulse train to go through dial pulse gate $G_3$, FIG. 18, into the dial pulse register. $\tau_1$ seconds after the completion of the units train, the counter is advanced to stage 3. The output of stage 3 is connected to gate $G_1$ at the input of the chronometer and to gate $G_4$ at the input of the synchronizer flipflop. Thus the input circuit of the chronometer is thereafter inhibited and the chronometer and counter will remain quiescent until they are reset when the link is released.

After the units digit is registered, the next operation of the link controller is to send out the contents of the dial pulse register to the interrogating translater. The output of stage 3 cannot be used directly as the control signal to open the time-allotting gates of the dial pulse register of FIG. 17. It will be recalled that the register reads out upon a time coincidence of the control signal and the link pulse. Since the counter is advanced by the dialing train, and dialing occurs independently of the link distributor pulse, it is possible that the leading edge of the control signal might occur during link pulse time and close to the trailing edge of the link pulse. This race condition might result in a small-sized register readout pulse which will cause a faulty initial readout of the register. To insure proper initial register readout, use is made of the synchronizer flipflop FF shown in FIG. 18. In essence, the counter advances to stage 3, gate $G_4$ is opened but the gate will not produce an output until certain operations are performed on the link pulse. In particular, the link pulse is differentiated, the phase of the output spikes is inverted by a phase inverter PH1 of conventional type, and the spikes are delayed by delay line $\tau_2$ before reaching gate $G_4$. The waveform at each stage of the operation is given in the synchronizer waveforms (4), (5) (6) and (7) of FIG. 18A. The first positive pulse of waveform (7) which reaches point (7) after the counter is advanced to stage 3, will get through gate $G_4$ and set the synchronizer flipflop. The output of the flipflop then serves as the control signal. Therefore, as can be seen from the synchronizer waveforms, the control pulse commences $\tau_2$ seconds after the trailing edge of the link pulse. $\tau_2$ is made small enough to insure that the control signal will occur before the next link pulse arrives from the link distributor. The control signal and the next link distributor pulse open the time-allotting gate of the dial pulse register and send the registered information to the interrogating translator.

At the same time, the control signal is sent to the busy-not busy discriminator for the purpose explained in the next paragraph. The level of the control signal remains constant until the link circuit is released.

*Busy-Not Busy Discriminator.*—The interrogating pulse train from the interrogating translator reaches the called line circuit. If the called line is not busy, the first interrogating pulse is sent back through the busy-not busy buffer matrix to the busy-not busy discriminator of the engaged link circuit. If the called line is busy, the not busy pulse will not be sent back. The purpose of the busy-not busy discriminator is to detect whether or not a pulse is coming back from the called line circuit at the appropriate time and to act accordingly. If the called line is not busy and the pulse comes back, the busy-not busy discriminator sends the pulse to the link B-marker which notifies it to mark the link. If the called line is busy, and the pulse does not come back, the busy-not busy discriminator opens the gate and places busy tone on the link. It should be noted that, starting with the opening of the time-allotting gate of dial pulse register and ending either with the line B-mark or placement of the busy tone, all of the above-mentioned operations take place simultaneously, neglecting the time delay which the pulses incur. This "simultaneous" condition exists because the above operations consist of the excursion of a pulse to a number of gates which are either open or closed, according to the system condition. The diagram of the busy-not busy discriminator is shown in FIG. 19 along with the pertinent waveforms (FIG. 19A) at various points. The case where the called line is idle will be considered first. The link distributor pulse, shown in waveform (1) of FIG. 19A, is available in each time slot of the link. The not-busy pulse comes back from the line circuit through the busy-not busy buffer matrix. The not-busy pulse, the control signal and the link pulse actuate AND gate $G_1$, and output waveform (5) is obtained. Waveform (5) actuates the link B-marker and at the same time sets flipflop $FF_1$. The not-busy pulse serves as an inhibiting pulse for AND gate $G_2$; therefore, an output is not obtained when a not-busy pulse arrives. However, the not-busy pulse will suffer a time delay during the course of its excursion through the interrogating translator, line circuit, and busy-not busy buffer matrix. Therefore, if the input of gate $G_2$ consists of only the waveforms (1), (3), and (4), gate $G_2$ will give an output before the not-busy pulse arrives to inhibit it. To avoid this race condition, the link distributor is delayed by $\tau_1$ and added to the inputs of gate $G_2$ as waveform (2). Delay time $\tau_1$ is chosen larger than the round trip time of the not-busy pulse. Therefore gate $G_2$ will not begin to give an output when the not-busy pulse arrives. It will be recalled that, for an idle line, only a single not-busy pulse is returned to the link circuit and its busy-not busy discriminator. On the other hand, the control signal from the link controller and the link distributor pulses persist as long as the link is busy. After the single not-busy pulse arrives, it is desired that gate $G_2$ remain inhibited in order to keep $FF_2$ from setting. To accomplish this inhibition, the right-side output of $FF_1$ is added to the input of $G_2$. Thus, once the not-busy pulse gets through $G_1$ and sets $FF_1$, the output of $G_2$ is checked by the output of $FF_1$. Thus, when the not-busy pulse arrives, the link B-marker is actuated to place a B-mark on the link.

The second case of interest is when the called line is busy. In this event, the not-busy pulse will not come back. Therefore, gate $G_1$ will not give an output and gate $G_2$ will give an output during the period between the beginning of waveform (2) and the end of waveform (1), providing the control signal, waveform (3), has begun. The output of gate $G_2$ sets flipflop $FF_2$, which in turn opens gate $G_4$ in FIG. 14 which places a busy tone on the link.

When the calling subscriber hangs up, the two flipflops are reset by the link reset pulse generator. Delay line $\tau_2$ in the reset line of $FF_2$ is provided to insure that the resetting of $FF_2$ will occur after the end of the control signal in order to eliminate the possibility that $FF_2$ might be set again after it is reset.

*Interrogating Translator and Busy-Not Busy Buffer Matrix.*—Both the interrogating translator IT and the busy-not busy buffer matrix BM are communicating paths between the link circuits and the line circuit. In particular, the IT serves as a path from links to lines and the busy-not busy buffer matrix BM serves as a path from lines to links. Both are used by the 20 link circuits and the 100 line circuits on a time-sharing basis.

*Interrogating Translator.*—The function of the interrogating translator IT is to translate the 2-out-of-20 called subscriber address as received from a dial pulse register into a 1-out-of-100 code which is sent to the corresponding line circuit as an interrogating pulse. The interrogating translator IT is a 10 x 10 selection matrix of 2-input AND gates, as shown in FIG. 20. The outputs of each of the 100 AND gates are connected respectively to each of the 100 line circuits, gate ($x$) having access to line circuit $x$, etc. Thus if the called subscriber is 32, only gate 32 will receive a pair of time coincident pulses and only line circuit 32 will be interrogated. It should be noted that a dial pulse register has access to the translator only during the time slot allotted to its link and interference between signals from different links is avoided.

*Busy-Not Busy Buffer Matrix.*—The purpose of the busy-not busy buffer matrix BM is to send not-busy pulses from a line circuit back to the link circuit which caused the generation of the interrogating pulse. The structure of the busy-not busy buffer matrix is shown in FIG. 21. The not busy pulses from 100 line circuits are dispatched into the 100-input OR gate. The output of the gate is connected through buffers B to each of the 20 link control circuits. Thus, all of the not busy pulses from 100 line circuits have access to each of the 20 link circuits. Since it is desired that the not-busy pulse reaches only the appropriate one of the 20 link circuits, a busy-not busy discriminator is supplied with each of the link circuits to perform the necessary steering.

*Distributors.*—For proper operation of the switching network, only one mark should occur at any given time in the network. The purpose of the originating mark distributor OMD is to provide a time slot for each line circuit in time sequence, and similarly the link distributor LD provides a time slot for each link in time sequence. Each line circuit in the process of originating a call sends one A mark toward the switching matrix SM during its allotted time slot, thus eliminating the possibility of more than one A mark being simultaneously placed in the matrix. Since the interrogating translator IT and busy-not busy buffer matrix BM are used in common by twenty link circuits on a time-sharing basis, it is necessary that each link circuit be allotted a separate time slot. The link distributor LD is provided for this purpose as well as for preventing the simultaneous occurrence of more than one B mark on the matrix. Finally, to eliminate the simultaneous occurrence of the A and B marks in the switching matrix, the originating mark distributor pulses and the link distributor pulses are out of phase.

*Timing Sequence.*—To meet the above-mentioned requirements, there are many possible timing schemes. FIG. 22 shows one timing arrangement for the originating mark distributor pulses (omdp) and link distributor pulses (ldp). As shown in FIG. 22, the originating mark distributor slots and the link distributor slots come alternately. The pulse duration is the same for both the omdp and the ldp. The time interval between omdp and the next ldp is the same as the pulse duration. The omdp time slots are distributed to the line circuits and the ldp to the 20 links. Since there are 100 lines and 20 links in the system and the omdp and ldp time slots are arranged alternately, all of the ldp time slots appear five times for one appearance of each of the omdp.

*Structure of Distributors.*—The block diagram of the distributor and its auxiliary devices is shown in FIG. 23 which indicates the requirements for both the omdp and the ldp. As shown, each distributor consists of two ring counters RC, two error correcting circuits ECC, and one selection matrix SEM. The master timer MT is used in common by the two distributors. Both ring counters RC are identical except for the number of stages. The outputs of the two counters are respectively connected to the horizontal and vertical inputs of a selection matrix SEM of AND gates, as shown in FIG. 24. The structure of the selection matrix SEM is the same as that used for the interrogating translator IT. Only one horizontal and one vertical are energized at a time and each time a pulse occurs on one of the vertical inputs, the pulse will also occur at some one of the horizontal inputs. Thus, only one gate a time gives an output. The output of the selection matrix SEM shifts from one gate to another in such a manner as to cover all the gates before any one gate gives two outputs.

*Ring Counter and Automatic Error-Correcting Circuits.*—The ring counter RC with its automatic error-correcting circuit AECC is shown in FIG. 25. The counter is of the shift register type. The operating pulse waveforms indicated in FIG. 25 are provided by the master timer. At most, only one of the master flipflops (MF) and one of the slave flipflop (SF) are in the set condition at the same time. The operation will be explained starting from the condition that only SF1 is set. The master set pulse (msp) is applied to all gates in the input circuits of the MF's. Since only the gate in the input circuit MF1 has two active inputs, MF1 is set by msp. Next, the slave reset pulse (srp) resets SF1. The slave set pulse (ssp) then sets SF2 in the same manner as SF1, and the master reset pulse (mrp) then resets MF1. Thus, one minor cycle of operation is completed and the ring counter is advanced by one stage. The operation will continue advancing with MF's successively giving outputs. The output waveforms of SF and MF are shown in FIG. 25A alongside the operating pulses. The four-stage counter shown can be extended to any number of stages by extending the flipflop chain.

The automatic error-connecting circuit AECC is provided to restore the counter when the error conditions mentioned above occur. When the counter is operating properly, gate $G_3$ will give an output and inhibit mrp at gate $G_4$. If the counter is in error, e.g. no stage is ON, no output appears at $G_3$ and thus mrp is not inhibited from setting SF4 as an error set pulse (esp). When more than one stage is ON, the counter advances until SF4 and some other SF's are ON. Then the lower two inputs of gate $G_2$ are energized by SF4 and another SF through $G_1$. Therefore, the next mrp gets through $G_2$ and resets all SF's as an error reset pulse (erp). The next mrp through $G_2$ sets SF4 as mentioned above. Thus, the abnormal conditions of the ring counter are automatically corrected.

*Master Timer.*—FIG. 26 shows the circuit of the master timer MT. As shown, the output of a pulse generator is fed into a two-stage binary counter. The output terminals of the counter are conneced to an AND gate tree. The output pulses of the gates are differentiated and become respectively mrp, msp, srp, and ssp which were mentioned above. Some of the waveforms at various points are indicated in FIG. 26A. Since OMD and LD are operated by the same waveform, the output waveforms of the ring counters of the omdp and ldp are alike. This is shown by waveform RC of FIG. 26A. Therefore, gates are provided at the output circuits of the ring counters; gate pulse $g_1$ gates the output waveform RC to shape up the ldp, and gate pulse $g_2$ shapes up the omdp. By the scheme, the omdp and the ldp are generated at different times as shown in FIG. 22.

*Typical Line and Link Circuits.*—The switching matrix SM utilizes at each crosspoint a single junction transistor operated in its "Delayed Collector Conduction" (DCC) mode. FIG. 27A shows a typical static collector voltage-current characteristic for such a DCC unit where the bias $I_b$ flowing into the base from a battery of voltage at $+E_{bb}$ is constant at 100 microamperes.

The curves of FIG. 28 illustrate the use of a DCC transistor as a crosspoint device. By an appropriate selection of load lines as shown by the curves, the transistor can have a stable ON operation point (N) and a stable OFF operating point (F); as shown by the curves, these points are separated by a peak-point (P) and a high negative resistance region. The DCC transistor has certain advantages when employed as the crosspoint element. First, it is inherently a stable and well-controlled device since it is a junction transistor. Second, its OFF impedance, which is the impedance of a junction diode biased in the reverse drection, is at least 1 magohm and can be made still higher (10 or 100 magohms) if silicon is used instead of germanium. Third, it exhibits negative resistance in that portion of its ON region which is within the permssible power-dissipation limits. Resultant power gains may accrue. Fourth, the DCC transistor exhibits polar symmetry in the first and third quadrants of its characteristic. Reverse currents from link to line are thereby prevented during B-marking time. These considerations have warranted the design of line and link circuits using the junction transistor devices (DCC) as the crosspoints A and B.

Both link circuits, as described below, also employ a junction transistor JT as a link termination LT. The collector voltage-current characteristic of a junction transistor operated with positive, constant, emitter current in the common base configuration is shown in FIG. 29. The constant current (large impedance) region is utilized to isolate the link from ground and thereby prevent insertion loss during conversation. The junction transistor, the effective impedance of which may be of the order of 1 megohm, is selected in preference to a large and expensive choke coil. In the bias-control link-lockout circuit shown in FIG. 30, the junction transistor $JT_2$ also functions as the link-lockout device. After crosspoint A fires, the DC current collector voltage assumed by the junction transistor (DCC) is sufficient to prevent the link from being seized by any but the called line. The base-control link-lockout circuit shown in FIG. 31 utilizes control of the third (base) terminal of the DCC transistor crosspoint to affect link-lockout.

*Bias-Controlled Link-Lockout Circuit.*—The bias-controlled link-lockout circuit is shown in FIG. 30. In the description of its operation, we will first consider the DC state of the circuit when (1) the link is idle, (2) crosspoint A has been fired, and (3) both crosspoints A and B have been fired. Neglecting these parts of the circuit which are present for switching purposes, we have the line supply voltage, $-E$ (where $E<V_p$, the peak voltage), in series with the A crosspoint and the link termination circuit LT (from point 1 to ground).

It is apparent that the only DC load for the crosspoint is that afforded by the impedance of the link termination LT. The latter is a junction transistor $JT_2$ operated with positive, constant, emitter current in the common base configuration. The characteristic consists of constant voltage ($-C_{cc}$) and constant current ($-\alpha I_e$). Its collector voltage is prevented from growing more positive than $-E_{cc}$ by diode $D_c$. The transistor collector always supplies constant current $-\alpha I_e$. This current enters either the diode or point 1 depending on the voltage of point 1.

When the link is idle, its voltage resides at $-E_{cc}$ and the line voltage at −E. After the calling subscriber goes "off hook," the link impedance serves as (1) a load for the single crosspoint A, or (2) a common load for crosspoints A and B. In the first case, the total current $\alpha I_e$ permitted by the link impedance goes through crosspoint A which may be denoted as $I_xN'$. A temporary operating point N′ is established for the DCC transistor operating as the crosspoint A. The voltage across the crosspoint may be denoted as $V_xN'$ and the link voltage as $V_kN'$. After B-marking, the total current $\alpha I_c$ permitted by the link impedance is divided into two parts, ½ $\alpha I_c$, flowing through each crosspoint A and B. The final operating point N is established for both crosspoints A and B. It is apparent from these figures that (1) the operating point N′ must be within the power dissipation limits of the DCC transistor, (2) the magnitude of the link-lockout voltage decreases when both crosspoints A and B are turned on, i.e., when it equals $V_kN-E_{cc}$, and (3) after crosspoint A fires, the impedance between link and ground is very large because the link termination device LT resides in the constant current region of its characteristic. All line junction transistors are assumed identical. The operating points of crosspoints A and B are established such that (1) the voltage across each crosspoint is the same, and (2) the sum of the crosspoint currents equals $\alpha I_e$.

Consider now the application of A and B marks to the circuit of FIG. 30. The D.C. voltage on the line is normally −E and is bypassed to ground by the large condenser C. Diode $D_n$ decouples the line from the −E source when the line is marked. The line transformer T has a secondary impedance $Z_t$ which is fairly large to release marks and pulses appearing on the line as a result of B-marking another called line. A, B and R (release) marks are applied to the diodes $D_a$, $D_{bn}$ and $D_r$, respectively. The A-mark is applied in series with the line-lockout resistor $R_a$. The B-mark is applied to the link through $D_{bk}$. Diode $D_{kk}$ clamps the link at $+E_{kk}$ during B-marking. Both $D_{bk}$ and $D_{kk}$ are normally cut off. The parallel combination of $D_k$ and the large resistor $R_k$ decouples the line from point 1 during B-marking. Diode $D_d$ decouples the link from the diode pulse register circuits except between A and B marks.

Before the A mark is applied, the link voltage is $-E_{cc}$ and the voltage across the crosspoint is $V_{xF}=E-E_{cc}$. Because $V_{xF}$ is smaller than the peak voltage $V_p$, the DCC resides at the point labeled F in the high impedance region of its characteristic (FIG. 28).

Application of the negative-going A-mark cuts off diode $D_n$. The amplitude of the pulse is such that the cathode of $D_a$ is driven to a voltage $-E_a$ which is more negative than the peak voltage $-V_P$ of the "highest" characteristic. When the transistor fires, the current through $R_a$ is limited to $\alpha I_e$ by the link load and an effective line-lockout voltage, $\alpha I_e R_a$, is developed across $R_a$. The resultant line voltage, $-E_a+\alpha I_e R_a$ must be more positive than $-\underline{V}_p$ in order to assure line-lockout action. In order to assure that the current $\alpha I_e$ is demanded from the link load the condition $-E_a+\alpha I_e R_a<-V_{xN'}$ is imposed. These two conditions determine the appropriate $R_a$. If $-E_a+\alpha I_e R_a$ is more positive than −E, the situation will be established before the A-mark retires; the line is clamped at −E when the transient voltage across $Z_t$ subsides. Otherwise, the line will be clamped at −E and the link voltage will become $-V_{kN'}$ after the A-mark retires. It may be noted that the lockout afforded by $R_a$ is necessary only during marking time. No lockout resistor appears in the line circuit itself. Furthermore, an inductor may be substituted for $R_a$.

After A-marking, the impedance from point 1 to ground is very large. Dial pulses may be read into the dial pulse register by suitable biasing $D_d$ between the A and B marks. Dial tone may be applied directly to the link through a diode or it may appear on the link as a result of modulating the emitter bias of the link load transistor.

B-marking consists of simultaneously raising the link potential from $-V_{kN'}$ to a positive voltage $+E_{kk}$ and pulsing the called line to a negative voltage $-E_b$. The B crosspoint and only the B crosspoint is fired if (1) $-E_b$ is more positive than $-\underline{V}_p$, (2) $E+E_{kk}<\underline{V}_p$, and (3) $E_b+E_{kk}$ is greater than $\overline{V}_p$. The link potential is raised by the positive current pulse applied to the link through diode $D_{bk}$. The magnitude of the current pulse exceeds $\alpha I_e$, the cross-point A current before B-marking. The current pulse develops a voltage across $Z_t$ of the calling line transformer and raises both line and link voltage. The link is clamped at $+E_{kk}$; the calling line voltage is prevented from going less negative than $-E+_{kN'}+E_{kk}$ by diode $D_n$. When the link voltage goes more positive than $-E_{cc}$, $D_k$ is cut off. Because $R_k$ is large, the link is decoupled from point 1 and the normal link load is replaced by the B-pulse current source. Finally, the negative-going B-voltage pulse is applied to the called line through the diode $D_{bn}$.

The release mark is a positive-going pulse applied to the line through diode $D_r$. If both crosspoints A and B are turned on, the release mark must be applied to each line. The sufficient condition that both crosspoints turn off is that the line voltage during the release mark should be driven less negative than $V_{xN'}$.

When the link is idle, the resistor $R_k$ returns the link to $-E_{cc}$. Because the DCC base-to-emitter leakage current is small in the OFF condition, $R_k$ may be large and still maintain the link at $-E_{cc}$. Since $R_k$ is large, the isolation function of $D_k$ will not be affected materially during B-marking time.

When both crosspoints A and B are turned on, a low impedance loop exists in the talking path. In order to assure that this loop impedance is positive at all frequencies, a small resistor $R_L$ (about 1K ohm) may be inserted in series with each line. The resistor offsets the negative resistance exhibited by the DCC transistor in the ON condition.

*Base-Controlled Link-Lockout Circuit.*—The previously described link-lockout action utilizes the two-terminal characteristics of the transistor crosspoint switch. After crosspoint A fires, the link is biased such that subsequent A-marks on other lines will not fire crosspoints connected to this link. In order to fire crosspoint B the link is temporarily placed in a super-preferred condition. Reverse biasing the link and simultaneously pulsing the called line with a B-mark (of smaller amplitude than an A-mark) fires crosspoint B and only crosspoint B. The base-controlled link-lockout circuit disclosed in FIG. 31 utilizes a three-terminal device at the crosspoint; the link bias technique being replaced by control of the third terminal. For illustrative purposes, a DCC transistor $JT_3$ is selected as the crosspoints A and B although other appropriate devices may be used. Because the peak or firing voltage of the DCC is the function of base current, the base is selected as the control terminal. Appropriate switching of the base supply voltage after crosspoint A fires and during B-marking time assures link-lockout action.

In a realistic circuit, the link must be terminated in a large impedance to audio frequencies when the talking path is completed which is afforded by a common junction transistor $JT_4$ operated at constant emitter current. Since link-lockout is not dependent on link bias, the transistor may be operated in its saturation region until both crosspoints A and B are fired. Firing the B crosspoint switches the transistor $JT_3$ to its constant collector current region providing the large link impedance.

FIGS. 32 and 32A show characteristic curves for the DCC crosspoint and link junction transistor used in the link-lockout circuit of FIG. 31. The DCC curves are collector current vs. collector voltage at three constant base currents. Although the link is terminated in a junction transistor, circuit operation assures that the link is virtually at ground potential until both crosspoints A and B are fired. Therefore, collector voltage may be consid-

UNITED STATES PATENT OFFICE
CERTIFICATE OF CORRECTION

Patent No. 3,141,067 July 14, 1964

Lester M. Spandorfer

It is hereby certified that error appears in the above numbered patent requiring correction and that the said Letters Patent should read as corrected below.

Column 22, line 19, for "cable" read -- stable --; column 23, line 8, after "constant" insert -- current --; line 22, for "terminals" read -- terminal --; line 44, for "substricker" read -- subscriber --.

Signed and sealed this 17th day of November 1964.

(SEAL)
Attest:

ERNEST W. SWIDER
Attesting Officer

EDWARD J. BRENNER
Commissioner of Patents switch at the intersection of the called line and the link; (10) the two B marks combine to select and turn ON the unique crosspoint switch, the B crosspoint, which gives the called subscriber access to the seized link and thus establishes a complete talking path between the two subscribers; (11) a portion of the ringing signal being sent back through the talking path via the B and A crosspoints to the calling subscriber as a ring-back signal; (12) means by which, as soon as the called subscriber operates his hook switch to the OFF-hook condition, the ringing signal is retired and conversation can begin; and (13) when the message is completed and both subscribers revert to the ON-hook condition means for causing both line circuits to be released by the cessation of the D.C. loop current and both line circuits to generate release marks which turn OFF the operated crosspoints.

8. The system of claim 7, in which if more than one subscriber requests service simultaneously, causing simultaneously several A or B marks to be placed on the switching matrix, to prevent inadvertent connections between the subscribers, said originating mark distributor is arranged to insure that only one A mark can occur at a time by allotting an operating time slot to each line in time sequence which allows only one A mark to take place during the allotted time, and said link distributor is arranged to allot an operating time slot to each link in time sequence to eliminate (1) the simultaneous occurrence of two or more B marks in the switching matrix and (2) a simultaneous use of interrogating translator and associated apparatus which are used commonly by all of the link circuits on a time-sharing basis, and to eliminate the simultaneous occurrence of A and B marks, the A and B marks are arranged to be out of phase with each other.

9. In a telephone switching matrix including the terminating portions of a plurality of subscriber lines, a plurality of transmission links crossing said line portions at different points, and a cross point switch at each of the intersections of the lines and links, a link terminating impedance for each transmission link comprising: a junction transistor having emitter, base, and collector terminals; a resistor and a first bias source serially connected between said emitter and base terminals; a diode and a second bias source serially connected between said collector and base terminals; said base terminal being connected to a source of reference potential; and coupling means for connecting said collector terminal to one of said transmission links.

10. The telephone switching matrix of claim 9 in which said coupling means comprises a resistor and a diode connected in parallel between said collector terminal and one of said transmission links.

References Cited in the file of this patent

UNITED STATES PATENTS

| | | |
|---|---|---|
| 2,522,000 | Shepherd | Sept. 13, 1950 |
| 2,816,961 | Jones | Dec. 17, 1957 |
| 2,876,285 | Bjornson et al. | Mar. 3, 1959 |
| 2,931,863 | Faulkner | Apr. 5, 1960 |

UNITED STATES PATENT OFFICE
CERTIFICATE OF CORRECTION

July 14, 1964

Patent No. 3,141,067

Lester M. Spandorfer

It is hereby certified that error appears in the above numbered patent requiring correction and that the said Letters Patent should read as corrected below.

Column 22, line 19, for "cable" read -- stable --; column 23, line 8, after "constant" insert -- current --; line 22, for "terminals" read -- terminal --; line 44, for "substricker" read -- subscriber --.

Signed and sealed this 17th day of November 1964.

(SEAL)
Attest:

ERNEST W. SWIDER
Attesting Officer

EDWARD J. BRENNER
Commissioner of Patents